April 2, 1946.  W. L. MAXSON ET AL  2,397,476
METHOD AND APPARATUS FOR CONTROLLING MOVING VEHICLES
Filed Dec. 1, 1939  13 Sheets-Sheet 7

INVENTORS
WILLIAM L. MAXSON
FREDERICK W. LUTZ
PETER J. McLAREN
NICHOLAS V. FEDOTOFF
BY ATTORNEYS

April 2, 1946. W. L. MAXSON ET AL 2,397,476
METHOD AND APPARATUS FOR CONTROLLING MOVING VEHICLES
Filed Dec. 1, 1939 13 Sheets-Sheet 8

INVENTORS
WILLIAM L. MAXSON
FREDERICK W. LUTZ
PETER J. McLAREN
NICHOLAS V. FEDOTOFF
BY
ATTORNEYS

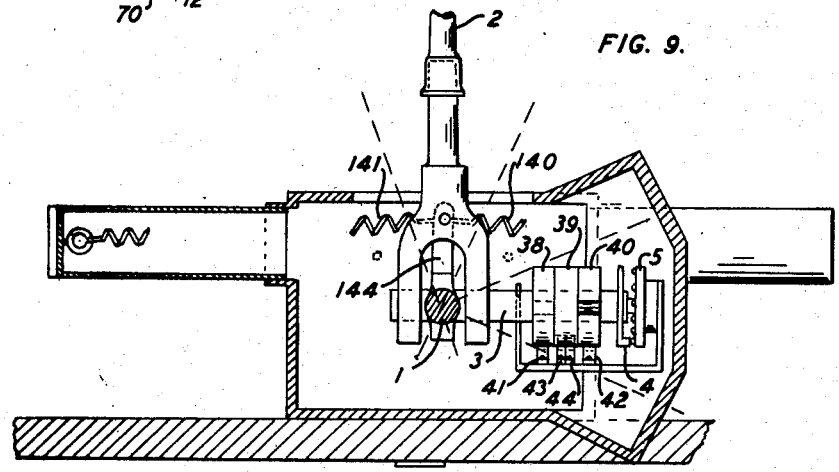

April 2, 1946.　　　W. L. MAXSON ET AL　　　2,397,476
METHOD AND APPARATUS FOR CONTROLLING MOVING VEHICLES
Filed Dec. 1, 1939　　　13 Sheets-Sheet 10

INVENTORS
WILLIAM L. MAXSON
FREDERICK W. LUTZ
PETER J. McLAREN
NICHOLAS V. FEDOTOFF
BY
ATTORNEYS

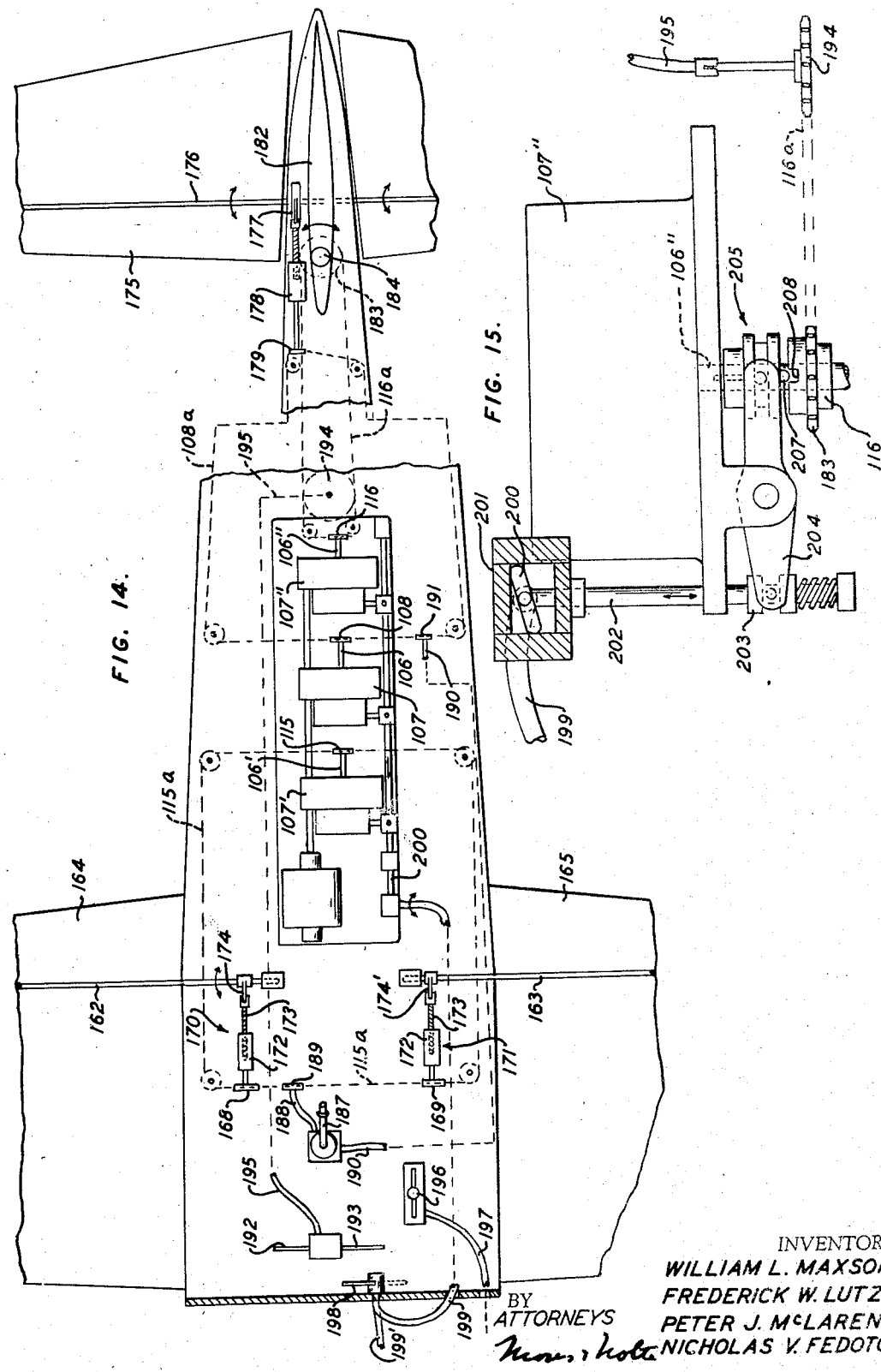

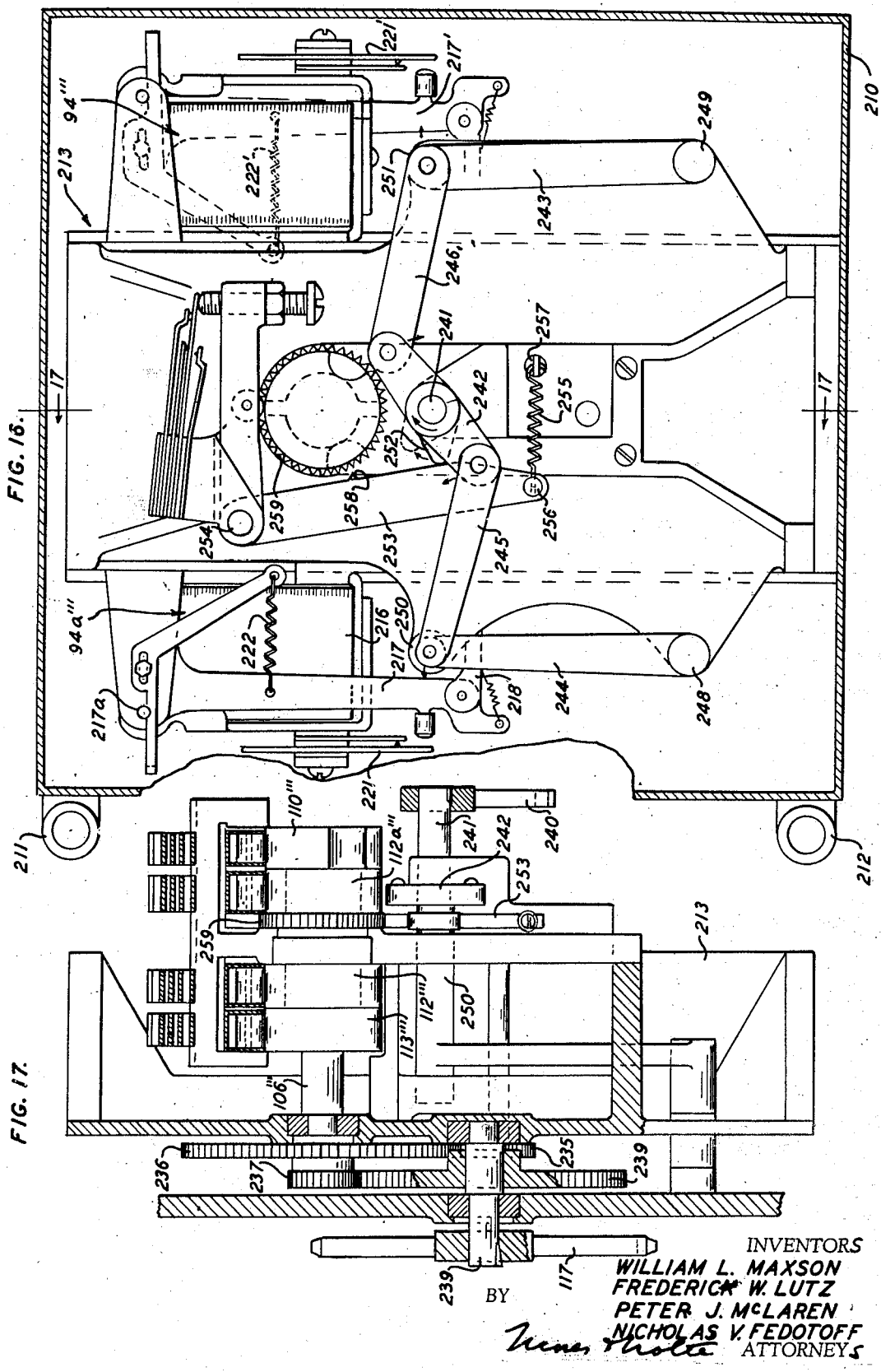

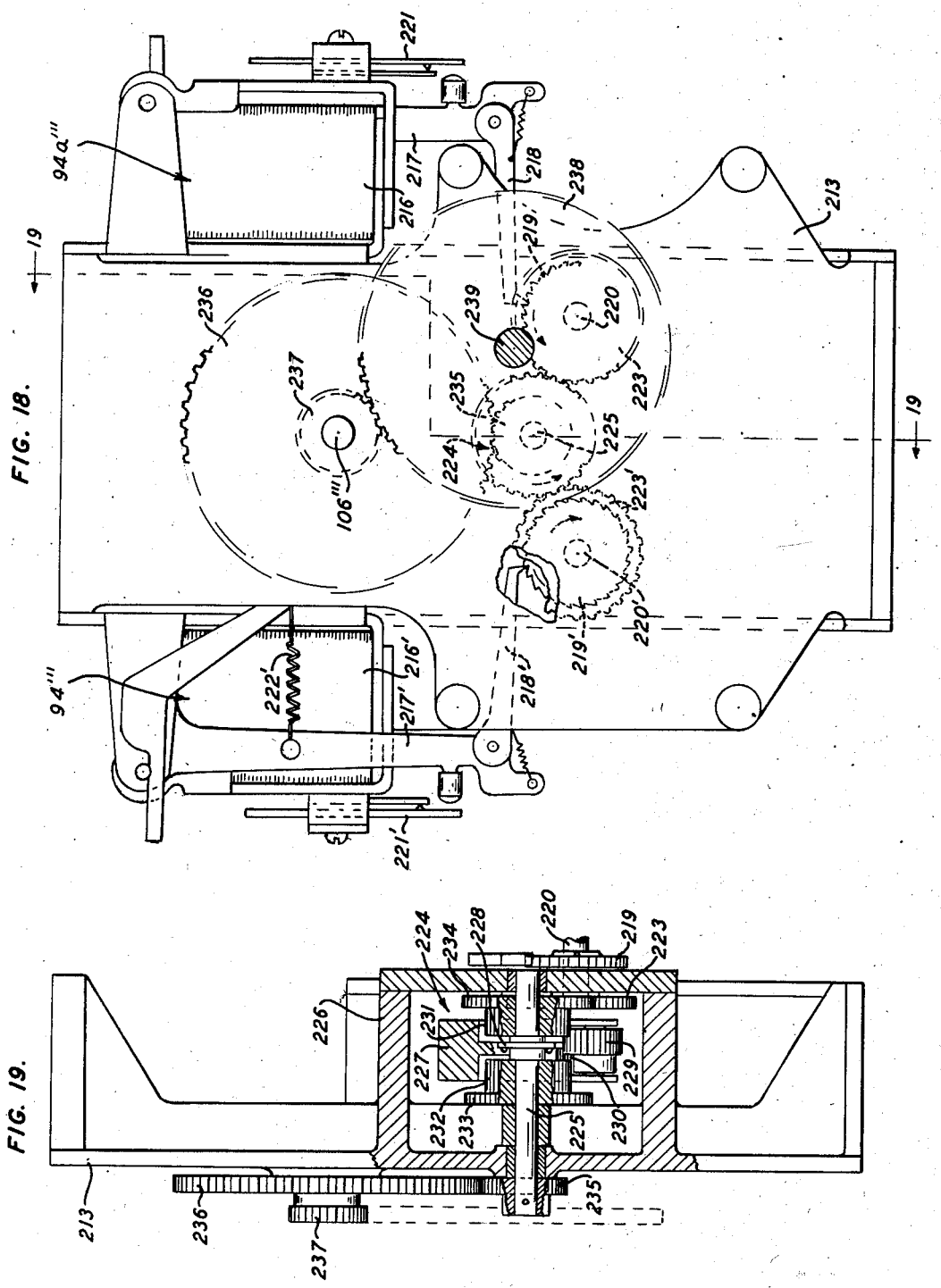

Patented Apr. 2, 1946

2,397,476

UNITED STATES PATENT OFFICE 2,397,476

METHOD AND APPARATUS FOR CONTROLLING MOVING VEHICLES

William L. Maxson, South Orange, N. J., and Frederick W. Lutz, Garden City, Peter J. McLaren, New York, and Nicholas V. Fedotoff, Lynbrook, N. Y., assignors, by mesne assignments, to The W. L. Maxson Corporation, New York, N. Y., a corporation of New York Application December 1, 1939, Serial No. 307,074

2 Claims. (Cl. 244—77)

This invention relates to the control of one or more parts of a device from a remote point by means of electrical impulses and more especially to the control of certain parts of an airplane, ship or other movable vehicle or to a part or parts of an object or objects carried by such vehicle. As illustrations of the use to which the invention is adapted, it may be employed to control the elevators, ailerons and rudder of an airplane, the engine throttle for control of the speed of the plane, flaps of the plane for landing purposes, instruments carried by the plane such as radio receivers or transmitters, cameras, or to control devices adapted to release objects such as bombs, etc., from airplanes.

In pursuance of the invention, the control of parts of or objects carried by a moving vehicle is effected by radio signals and preferably by the transmission to the vehicle of a modulated carrier wave of radio frequency, a suitable radio receiver being provided on the vehicle to receive the control signals and transmit them to suitable apparatus which accomplishes the desired control of the intended part or parts.

It is an object of the invention to effect the control of the desired part or parts through any desired extent or angle of adjustment by the transmission of pulses of energy of controlled duration and to provide at the controlled device, suitable mechanism which effects the control in accordance with the duration of the pulses.

To provide energy pulses of any desired duration, it is a further object of the invention to provide at the transmitting station a novel means and method for controlling the action of one or more control channels which effect the modulation of the transmitted carrier wave. In pursuance of this object, the control of the modulator is preferably effected by a novel circuit arrangement which includes a relay and a relay control device.

Another object is to provide suitable mechanism for the control of a movable controlled part on the airplane or other vehicle by a control handle located at a ground station or in another vehicle, the controlled member moving in one direction or in an opposite direction in accordance with the movement of the control handle in one direction or in an opposite direction from a neutral position thereof. The mechanism also provides for the movement of the controlled member or part in accordance with the extent of adjustment or angle of rotation of the control handle.

A still further object is to provide for the control of two different control devices or members on an airplane or other vehicle by means of a single control handle located at a ground station or in another airplane or vehicle. The control handle is preferably mounted for universal movement similar to the control stick of an airplane, so that it may be rotated about either a lateral axis or a longitudinal axis or about both axes simultaneously.

A further object is to provide at the ground control station a rotatable platform on which the operator may be seated and on which is disposed within his easy reach the several control members which control the parts of the airplane which determine its flight. Suitable means for rotating the platform, either by the operator seated thereon or by an assistant standing on the platform, are provided so that the operator may keep the controlled airplane constantly in view as it moves in accordance with his manipulation of the control members.

Other and further objects of the invention will become apparent to those skilled in the art as the description thereof proceeds. For a better understanding of the invention, however, reference is made to the accompanying drawings, in which:

Figs. 8 and 9 are fragmentary views, partly in section, showing in further detail portions of the control stick and platform shown in Fig. 7;

Fig. 10 is a fragmentary view, partly in section showing the rudder control pedals and associated control apparatus;

Figs. 11 and 12 are sectional views of the throttle control lever and associated control apparatus;

Fig. 14 is a fragmentary plan view of an airplane showing control apparatus embodying the invention mounted thereon;

Fig. 15 is a fragmentary view showing the clutching and declutching arrangement for the control apparatus embodying the invention;

Fig. 16 is a front view of the remote control throttle operating device with its mounting and supporting housing shown in section;

Fig. 17 is a sectional view of the throttle operating device taken on the line 17—17 of Fig. 16;

Fig. 18 is a view showing the impulse motors and their associated driving gearing of the throttle operating device and;

Fig. 19 is a sectional view of the gearing and its supporting housing taken on the line 19—19 of Fig. 18.

Figure 1:
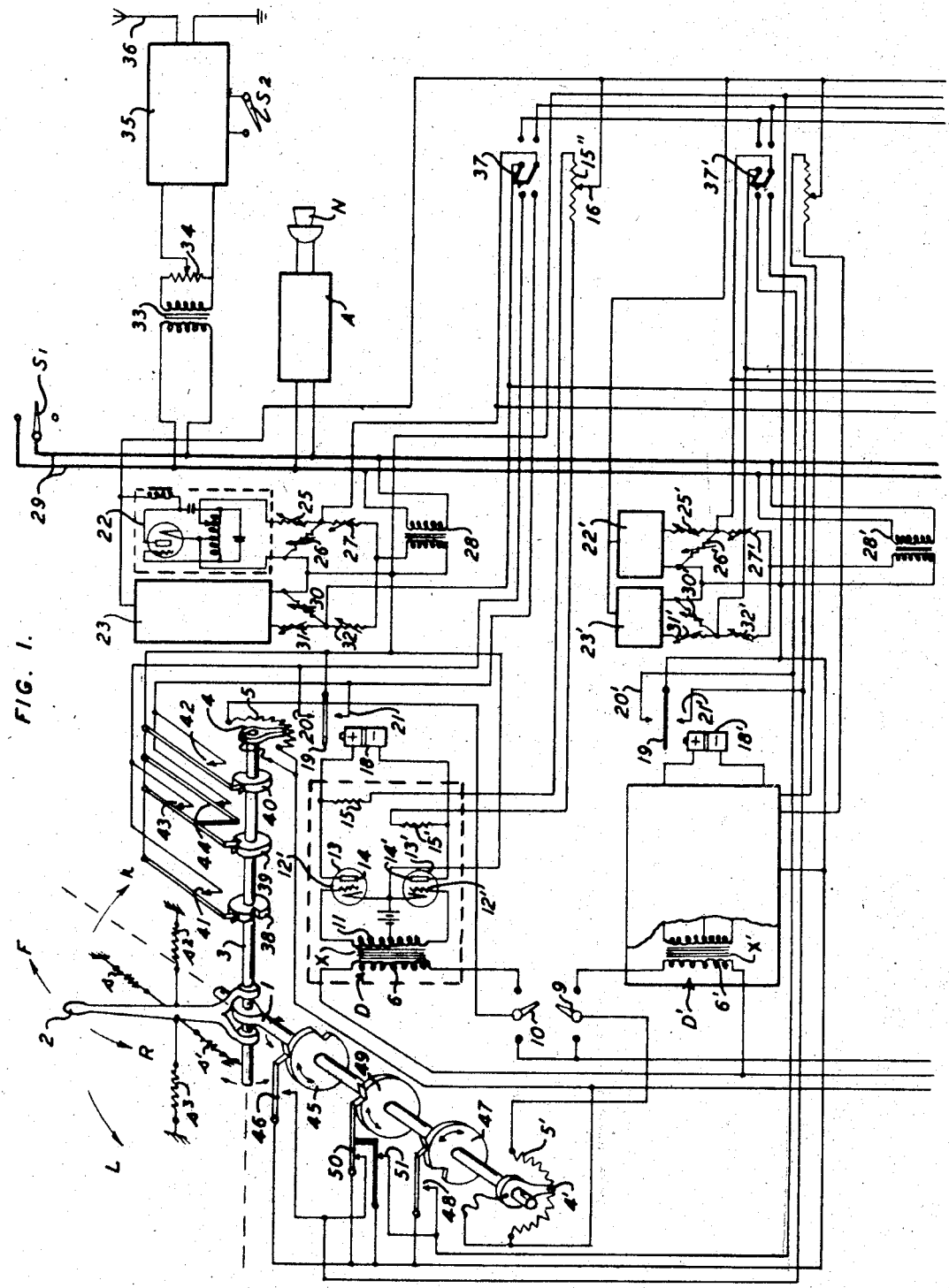
Fig. 1 is a schematic circuit diagram of a radio transmission system embodying the invention and also showing certain mechanical control features schematically.

Referring to Fig. 1, a rotatable control shaft 1 is shown as provided with a control lever or stick 2 mounted for universal movement, in the manner of the usual control stick of an airplane, so that its rotation in a plane normal to the longitudinal axis of shaft 1 causes rotation of this shaft, while its rotation in a plane passing through the axis of shaft 1 causes rotation of a shaft 3 mounted to rotate about a lateral axis at right angles to shaft 1. Rotation of lever 2 in intermediate planes obviously causes rotation of both the shafts 1 and 3 simultaneously. A rheostat arm 4 mounted on shaft 3 serves to control a variable resistor 5 adapted to be connected in series with the primary winding 6 of an iron core transformer X and a battery 7 (Fig. 3) through the leads shown and switches 8 (Fig. 3), and 10 (Fig. 1). Transformer X comprises one of the components of a differentiator designated generally by the reference letter D and which comprises the secondary winding 11 having its opposite ends connected to the control grids 12, 12' of the vacuum tubes 13, 13'. The plates 14, 14' of these tubes are connected to the ends of a circuit including the series connected resistors 15, 15', 15", an intermediate point of resistor 15" being connected through adjustable contact 16 and the lead shown to the positive terminal of a battery 17 (Fig. 3) whose negative terminal is grounded as shown. The plates 14, 14' are also connected to the terminals of a polarized relay 18 provided with an armature 19 which cooperates with the upper and lower contacts 20 and 21. Sliding contact 16 is adjusted so that normally no current passes through the winding of relay 18 and its armature 19 remains in the mid-position shown.

It will be understood that a differentiator similar to D operating a polarized relay similar to 18 is provided for each airplane part or other device to be controlled, the differentiators being designated by D', D", D"', etc., and their component parts being designated by similar numerals primed, double primed, etc. Differentiator D' and its connected relay 18' are connected to resistor 5' over which the contact arm 4' carried by shaft 1 operates, the resistor 5' being connected to the primary winding 6' of the input transformer X' through the circuit shown including the switch 9. Movement of the handle 2 to rotate the shaft 3 in one direction may tilt the elevators upward from their mid-position and its movement in the opposite direction causes them to tilt downwards. Movement of handle 2 to rotate shaft 3 in one direction will then serve to control the elevators to elevate the airplane whereas its movement in the opposite direction controls them in a direction to depress the airplane.

Movement of the handle 2 to rotate shaft 1 in one direction may lower the right aileron from its normal wing position and raise the left aileron whereas its movement in the opposite direction causes the left aileron to be lowered from its normal wing position and the right aileron to be raised. Thus a movement of the handle 2 in one direction to rotate shaft 1 will serve to bank the airplane on its left side and movement of handle 2 in the opposite direction will serve to bank it on its right side.

For each of the relays of the system, a pair of sources of signalling tone are provided such as 22—23, 22'—23', etc., each source comprising an audio frequency oscillator, such as 24, whose output terminals are connected through the resistance network 25, 26, 27 and transformer 28 to the tone bus bars 29. The output terminals of tone generator 23 are shown connected to the primary of a transformer 28 through the resistance network 30, 31, and 32, the several resistors of the networks being adjustable, as indicated, in the preferred construction. The tone bus bars 29 are connected by any suitable means, such as the transformer 33 and variable resistor 34 to the modulator input terminals of a radio frequency transmitter 35 arranged to generate a carrier current of constant frequency. The output terminals of transmitter 35 are connected to an antenna 36. When the transmitting equipment is located at a ground station, one of the transmitter terminals may be connected to ground, as shown, and when the transmitting equipment is located on a movable vehicle, as, for example, in another airplane, any suitable known type of transmitting antenna may be provided. The tone frequency generators 22—23, 22'—23', 22"—23", etc., are preferably designed to generate currents of 1020, 1380, 1860, 2460, 3180, 4020, 4740 and 5340 cycles per second, respectively although it will be understood that other suitable frequencies may be used. This particular series of frequencies has been selected to provide for adequate selection and segregation of the tone frequencies at the receiver. It also serves to prevent interference between harmonic frequencies and also that due to the sum and difference frequencies at the receiver.

In the operation of the transmitter, rotation of shaft 3 by the lever 2 changes the value of resistance 5 by an amount proportional to the throw of the lever, thereby changing the value of the direct current passing through primary winding 6 of transformer X. If lever 2 is rotated clockwise about shaft 3 from the neutral or mid-position shown, resistance 5 is increased, causing a pulse of current in secondary winding 11 in one direction whereas if the lever is rotated counter-clockwise about shaft 3 from the neutral position, the pulse of current generated in secondary 11 will be in the opposite direction. A voltage is thus produced across secondary 11, the direction of which depends on the direction of movement of lever 2 and the duration of which depends on the extent of its movement. This voltage is caused, through the amplifier tubes 13—13', to operate polarized relay 18 so that its upper contact 20 is closed in response to a voltage in secondary 11 in one direction and its lower contact 21 closed in response to a voltage pulse in the opposite direction. The relay contacts are selectively maintained closed until lever 2 is brought to a position of rest, or during a desired time interval. Motion of lever 2 in a direction to cause armature 19 to close the lower contact 21 causes a short circuit of resistor 26, the switch 37 being closed in its position to the left. This prevents the tone frequency of 1020 cycles generated by oscillator 22 from being impressed on the bus bars 29 and transmitter 35 while lever 2 is in motion, the tone frequency of 1380 cycles being transmitted during the motion of the lever. Upon lever 2 becoming stationary, the grids 12 and 12' are at the same potential and the plate circuits of tubes 13—13' are again balanced so that no current flows through the windings of relay 18 and armature 19 returns to its open position. Thereupon both the tone frequencies of 1020 and 1380 cycles are transmitted.

Similarly, motion of lever 2 in an opposite direction causes the plate circuits of tubes 13—13' to become unbalanced so as to cause current to flow through the winding of relay 18 in such direction as to close the upper relay contact 20, thereby short circuiting resistor 30. This prevents the tone frequency of 1380 cycles generated by oscillator 23 from being impressed on bus bars 29 and transmitter 35. It thus follows that the rotation of control lever 2 in one direction causes one of the oscillator tone frequencies to be omitted from the transmission by the carrier wave, the duration of this omission being proportional to the extent of throw of lever 2. Similarly, rotation of the lever in the opposite direction causes the other oscillator tone frequency to be omitted from the transmission. Since, as will be explained later, the response of the controlled function of the airplane depends on the length of time that a tone is eliminated, it follows that for optimum results, the operator should move lever 2 at equal velocities at all times so as to secure the closest possible agreement in phase relationship between the control lever at the ground station and that on the aircraft. However, during the normal running of an airplane, the control lever is continuously passed through its neutral or mid-position, at which point synchronization of the control lever on the airplane and that at the ground station is reestablished in the event that there is not a close agreement in phase relationship.

For the purpose of establishing this synchronization, shaft 3 is provided with the cams 38, 39 and 40, cam 38 serving to open and close a switch 41, cam 40 to open and close a switch 42 and cam 39 to open and close both of the switches 43 and 44. When lever 2 is brought to the neutral position shown in Fig. 1, switches 43 and 44 are both closed. Since the upper switch 43 is connected in parallel with upper relay contact 20 and armature 19 and the lower switch 44 is connected in parallel with lower relay contact 21 and armature 19, both the tone frequencies generated by the generators 22 and 23 will be omitted from the transmission, which causes the controlled shaft on the airplane to be moved into its neutral position, by means to be described later.

While lever 2 is being moved forward in the direction F the upper relay contact 20 closes, eliminating the tone frequency of generator 23 from the transmission and causing the controlled member on the airplane to move in the same direction. When lever 2 is stopped at its extreme forward position the armature 19 is returned to its neutral position but cam 38 has closed the switch 41 which provides a short circuit across upper contact 20 and armature 19, thereby continuing the omission of the tone frequency of generator 23 from the transmission. This omission causes the controlled member to continue its motion in the same direction until it reaches its extreme forward position when it is again in phase with control lever 2. In a similar manner, movement of lever 2 rearwardly from its neutral position, as indicated by R, causes the closure of lower relay contact 21 and the omission of the tone frequency of generator 22 from the transmission. When lever 2 is stopped at its extreme rearward position, the lower relay contact 21 is opened but cam 40 has closed the switch 42 which provides a short circuit across lower contact 21 and armature 19, thus continuing the omission of the tone frequency of generator 22 which causes the controlled member on the airplane to move rearwardly until it reaches its extreme rearward position, when it is again in phase with control lever 2. Means is thus provided for causing the tone frequencies of both generators 22 and 23 to be suppressed when lever 2 is in its neutral position; when it is moved forward, the frequency of generator 23 is omitted. This frequency continues to be omitted when the lever reaches its extreme forward position as long as it remains in that position. When the lever is moved rearward from its neutral position the frequency of generator 22 is omitted and continues to be omitted after the lever has reached its extreme rearward position and as long as it remains there.

Movement of lever 2 about the longitudinal axis causes shaft 1 to rotate and contact arm 4' to operate the differentiator D' by changing the current through resistor 5'. Movement of lever 2 to the left, as indicated by L, causes the closing of the lower contact 21' of relay 18' thereby eliminating the tone of generator 22' from the transmission and causing the controlled member to move to the left. When lever 2 reaches its extreme leftward position, cam 45 causes the closure of switch 46 which short circuits the resistor 26' and thus continues the suppression of the tone of generator 22' and movement of the controlled member into its extreme leftward position in phase with lever 2. Similarly, movement of lever 2 to the right as indicated by r, causes the closing of upper contact 20' of relay 18' and the consequent elimination of the tone frequency of generator 23' from the transmission and the movement of the controlled member to the right. When lever 2 is moved into its extreme position to the right, cam 47 causes the closure of switch 48 which short circuits the resistor 30' and thus continues the elimination of the tone frequency of generator 23' and causes the movement of the controlled member into its extreme rightward position when it is again in phase with lever 2. For the purpose of eliminating the tone frequencies of both generators 22' and 23' when lever 2 is in its neutral position, and thus bringing the controlled member into its neutral or mid-position, shaft 1 is provided with a cam 49 which causes the closure of the upper and lower switches 50—51 which are connected with the lower and upper contacts 21' and 20', respectively.

For the purpose of readily eliminating all the tones from the transmission, a bus bar switch S1 is provided, the closure of which serves to short circuit the bus bars 29. The closure of this switch, by the elimination of all the tone frequencies, serves to cause all the controlled members on the airplane to be automatically returned to their mid or neutral positions in a manner to be later described. For the purpose of eliminating the carrier from the transmission in order to release a relay which in turn controls all the torque amplifier motors to be later described, the transmitter 35 is provided with a switch S2, the closure of which stops the transmission of the carrier wave. Where speech communication with an operator on the controlled airplane or other vehicle is desired, a microphone N and audio frequency amplifier A may be provided, the output terminals of the amplifier being connected to the tone bus bars 29, as shown in Fig. 1.

Figure 2:
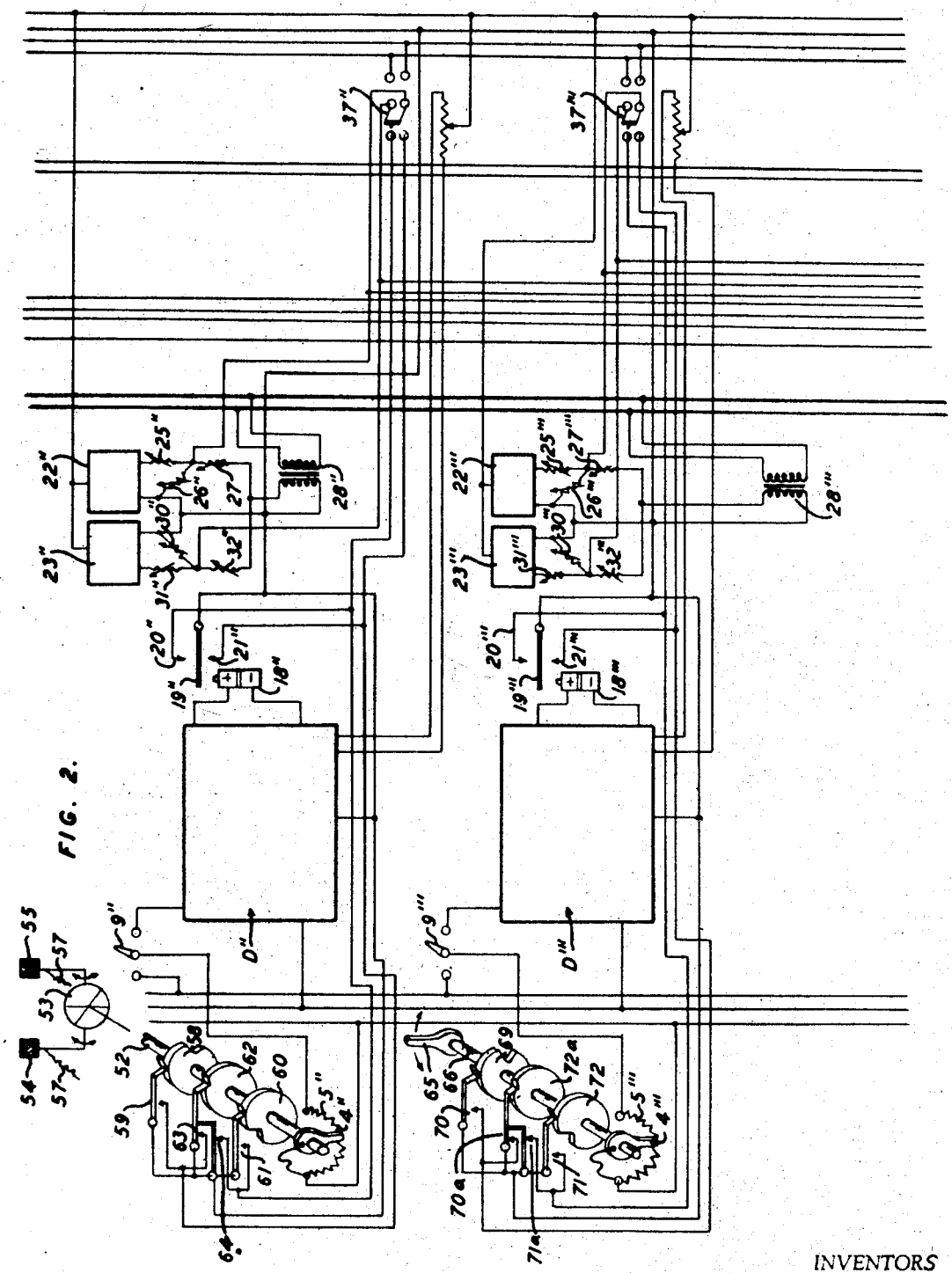
Fig. 2 is a schematic diagram showing an extension of the transmitting system of Fig. 1 to provide for the remote control of the rudder and throttle of the airplane.

Fig. 2 is a continuation of Fig. 1 and shows diagrammatically a portion of the means for controlling the rudder and throttle of the controlled airplane. The control shaft 52 is provided with a differential 53 to which the left and right rudder control pedals 54, 55 are connected, suitable springs 57 connected to pedals 54, 55 urging the pedals to a neutral position. As in the case of the shaft 1 of Fig. 1, depression of pedal 54 to rotate shaft 52 counterclockwise causes differentiator D'' and relay 18'' to close the lower contact 21'' of the relay and eliminate the tone of generator 22'' from the transmission. To continue the elimination of this tone when shaft 52 has reached its extreme counterclockwise position, the cam 58 and switch 59 are provided, the closure of switch 59 shortcircuiting armature 19'' and lower relay contact 21''. Depression of the right pedal 55 to rotate shaft 52 clockwise, causes differentiator D'' and relay 18'' to close the upper relay contact 20'' and eliminate the tone of generator 23''. The cam 60 closes the switch 61 which short circuits armature 19'' and upper relay contact 20'' and serves to continue the elimination of the tone of generator 23'' while shaft 52 is maintained in its extreme clockwise position. Also, as in the case of Fig. 1, shaft 52 is provided with a cam 62 which serves to close both the switches 63 and 64 which are shunted across the lower and upper relay contacts 21'' and 20'', respectively, to eliminate the tone frequencies of both generators 22'', 23'' as long as the rudder control shaft 52 remains in its neutral position as shown.

Fig. 2 also shows schematically a throttle adjusting arm or lever 65 connected to a throttle control shaft 66. Adjustment of the arm 65 to rotate shaft 66 counterclockwise to close the throttle causes differentiator D''' to operate relay 18''' and close the lower relay contact 21''', thereby eliminating the tone of generator 22''' from the transmission. Cam 69 and switch 70 serve to continue the elimination of the tone of generator 22''' while the shaft 66 remains in its extreme throttle-closing position, the switch 70 serving to short circuit armature 19''' and contact 21'''. Adjustment of arm 65 in the opposite direction to open the throttle causes the closing of the upper relay contact 20''' and the elimination of the tone of generator 23''' from the transmission. With shaft 66 adjusted to full throttle opening position the suppression of the tone of generator 23''' is continued by the closure of switch 71 by the cam 72, switch 71 then short circuiting armature 19''' and contact 20'''. For the purpose of bringing the throttle into its mid-position when the control arm 65 is adjusted into its mid-position, the shaft 66 is provided with a cam 72a which closes the switch contacts 70a and 71a upon the arm 65 being adjusted into its mid-position. Since the closure of switches 70a and 71a serves to short circuit the armature 19''' and its upper and lower contacts 20''' and 21''', the tone frequencies of both the generators 22''' and 23''' are eliminated from the transmission.

Figure 3:
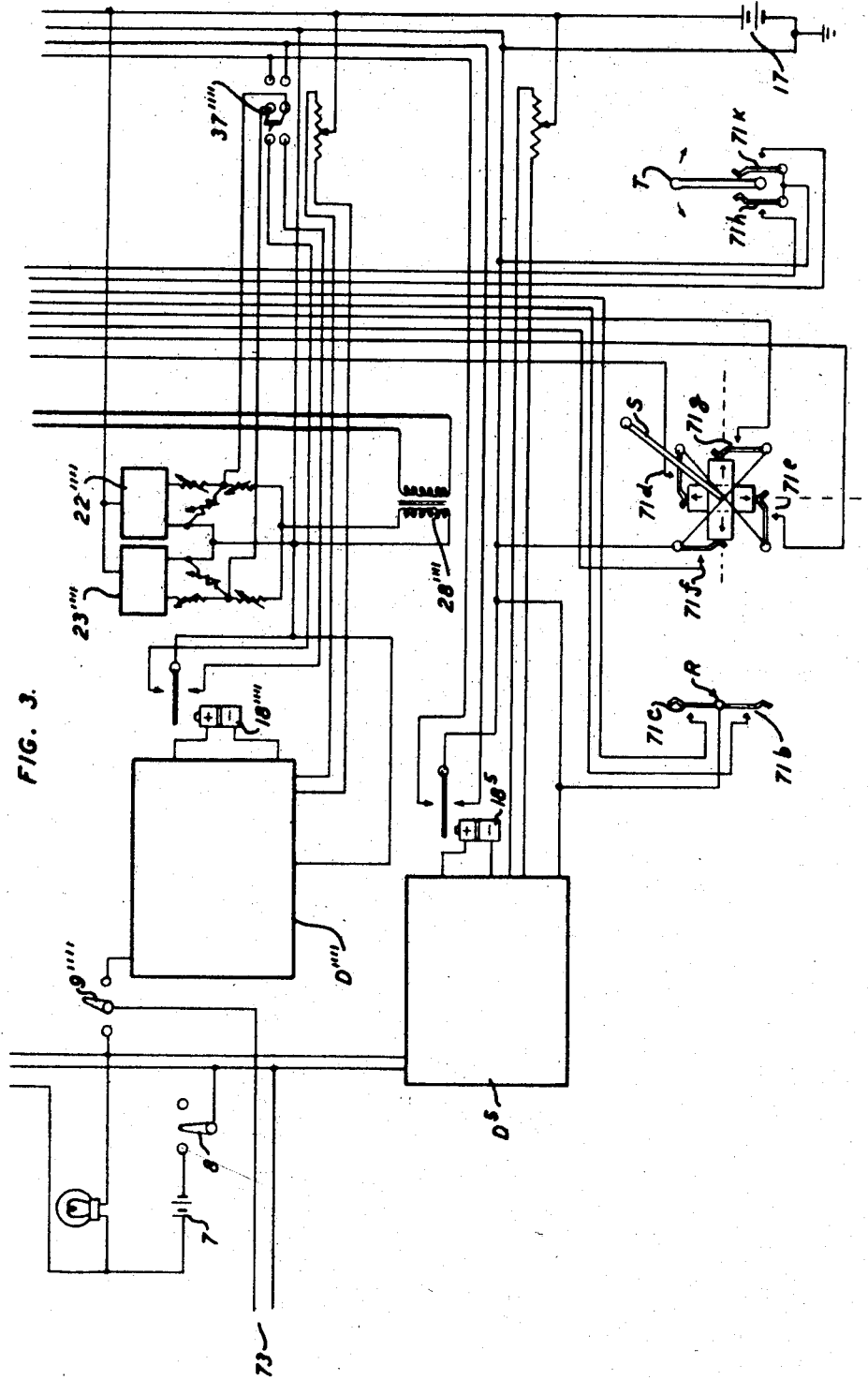
Fig. 3 is a schematic circuit diagram showing a further extension of the transmitting system of Fig. 1 to provide for emergency or spare apparatus adapted to be connected in the transmission system instead of certain apparatus shown schematically in Figs. 1 and 2 and for supplementary miniature controls.

Fig. 3 shows a differentiator D'''' which may be employed to control special devices on the controlled airplane such as a smoke release device or a device for releasing a bomb. This differentiator and its associated tone generators operate in the same manner as the others above described. The control circuit for D'''' is intended to be connected across the terminals 73, the switch 9'''' being thrown to the right when this differentiator is in use.

Fig. 3 also shows a spare differentiator $D^5$ which is for reserve use and may readily be substituted for any one of those previously described if for any reason a differentiator becomes disabled. Should the differentiator D' of Fig. 1, for example, become disabled, by throwing its switch 9 to the left and the switch 37' to the right, it will be disconnected from the tone generators 22'—23' and control of these generators will be taken over by differentiator $D^5$ and its associated relay $18^5$. Rotation of lever 2 and shaft 1 about the longitudinal axis will then act to control the elimination of the tone frequencies of generators 22'—23' through the differentiator $D^5$ and its associated relay $18^5$.

Fig. 3 also shows auxiliary control means provided for emergency use in the control of the throttle, ailerons, elevators and rudder of the controlled plane. The auxiliary rudder control means R consists of a pair of switches 71b and 71c which represent the left rudder pedal 54 and right rudder pedal 55 respectively. Closure of switch 71b serves to short circuit the resistor 26'' and thereby eliminate the tone frequency of generator 22'' from the transmission, while closure of switch 71c short circuits the resistor 30'' thus eliminating the tone frequency of generator 23'' from the transmission. It will be understood that the switches 37, 37', (Fig. 1) and 37'', 37''' (Fig. 2) are open when the auxiliary controls are used.

The auxiliary aileron and elevator control comprises a miniature control stick S which is arranged to selectively actuate and close the switch contacts 71d, 71e, 71f and 71g. Movement of stick S to close the switch 71d serves to short circuit the resistor 26 (Fig. 1) and eliminate the tone frequency of generator 22 from the transmission, thereby operating the up elevator, while movement of the stick to close switch 71e serves to short circuit the resistor 30, Fig. 1, and eliminate the tone frequency of generator 23 from the transmission, thereby operating the down elevator. Movement of stick S to close switch 71f serves to short circuit the resistor 26', Fig. 1, and thus eliminate the tone frequency of generator 22' from the transmission to operate the left aileron. Movement of the stick to close the switch 71g serves to short circuit the resistor 30', Fig. 1, and eliminate the tone frequency of generator 23' from the transmission and operate the right aileron.

The auxiliary throttle control comprises a throttle control lever T which may be moved to the right or left from the position shown in Fig. 3 to open or close the throttle. Movement of lever T to the left serves to close the switch 71h which short circuits the resistor 30''', Fig. 2, causing the elimination of the generator 23''' from the transmission and the opening of the throttle. Movement of lever T to the right serves to close the switch 71k, which short circuits the resistor 26''', Fig. 2, thereby causing the elimination of the tone of generator 22''' from the transmission and the closing of the throttle. It will be noted that the switches actuated by the auxiliary controls R, S and T eliminate the tone frequencies of the desired generators by direct connections between the several switches and the output terminals of the generators and not through the differentials D, D', etc., and their controlled differential relays 18, 18', etc. While the miniature or auxiliary controls described are not provided with automatic means for obtaining synchronization of the corresponding controlled parts, yet by holding either of the auxiliary controls in its extreme position a suitable length of time, the corresponding controlled member will be adjusted into its extreme position and be brought into phase with the control member, in case the two have been out of phase or synchronization.

Figure 4:
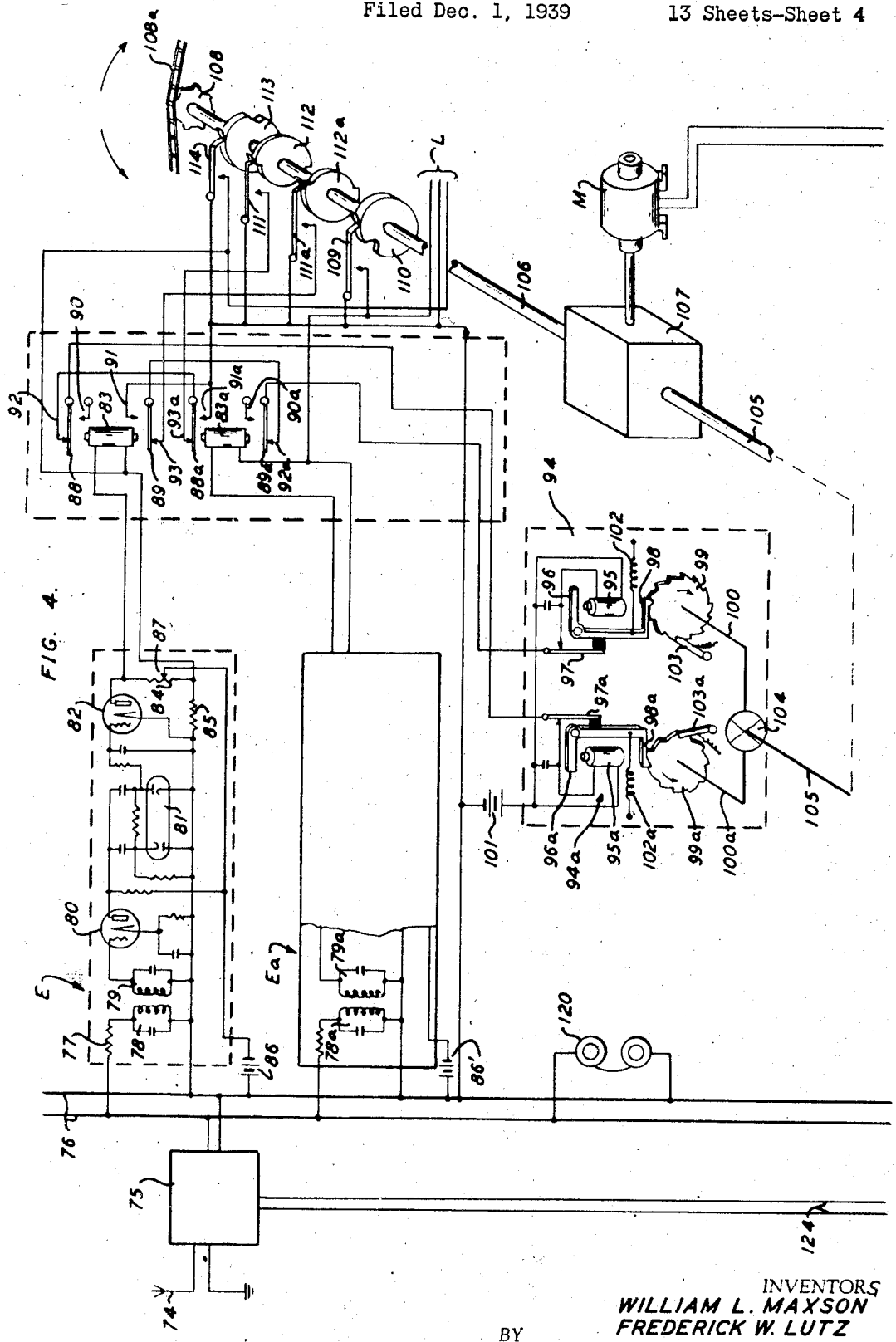
Fig. 4 is a schematic circuit diagram of a radio receiving system embodying the invention also showing certain features of the controlled apparatus schematically.

Referring now to Fig. 4 which shows schematically the apparatus mounted on the controlled airplane for controlling its ailerons, a receiving antenna 74 is connected to the input terminals of a tunable radio receiver 75 which is provided with known means for receiving the carrier wave of transmitter 35 and detecting and amplifying its modulating tone frequencies. The output of receiver 75 is applied to the tone bus bars 76, to which a plurality of tunable amplifying channels E, Ea, E', E'a, etc., responsive to the tone frequencies of generators 22, 23, 22', 23', etc., respectively, are connected. Each of these channels is similar in construction and comprises a frequency selective network comprising an isolating resistor 77 and two parallel resonant circuits 78, 79, both tuned to the audio frequency to which the particular channel is responsive. The selected current is amplified in the amplifier tube 80 and rectified in the rectifier tube 81. The rectified output of tube 81 is amplified in the direct current amplifier tube 82. The plate circuit of amplifier tube 82 actuates a relay 83 and comprises the resistors 84, 85 and a plate battery 86. One terminal of battery 86 is connected to an adjustable contact 87 which is preferably so adjusted that no direct current flows through the winding of relay 83 when the tone frequency to which channel E is responsive is not being received. The channel Ea is similar in all respects to channel E except that its input circuits 78a, 79a are resonant to the frequency of generator 23, its output circuit being connected to relay 83a. Relay 83 is provided with a pair of armatures 88, 89 adapted to selectively engage the inner contacts 90, 91 and the outer contacts 92, 93. The corresponding contacts of relay 83a are designated 90a, 91a, 92a, 93a and its armatures 88a, 89a.

For each of the relays 83, 83a a self-vibrating motor 94, 94a is provided, these motors being similar, and motor 94 comprising a coil 95 and a movable armature 96 provided with a movable contact 97 and a pawl 98 which cooperates with the teeth of a ratchet wheel 99 mounted on a shaft 100. The movable contact 97 of motor 75 armature 96 is connected, as shown, to armature 89a and current is supplied to coil 95 by a battery 101. A spring 102 having one end connected to a stationary point and its other end to armature 96 serves to move pawl 98 to the right after the motor circuit is broken by movable contact 97.

When the relays 83, 83a are both energized due to the transmission of the tone frequencies of both the channels E and Ea, the energizing circuits of motors 94 and 94a are open at contacts 92, 92a so that both motors are at rest. When, however, one of the relays, as for example, relay 83 becomes de-energized, due to the cessation of transmission of the tone of channel E, its upper contact 92 is closed, thereby completing the circuit of motor 94a and causing its armature 96a to rotate counter-clockwise and move pawl 98a a sufficient distance to engage pawl 98a behind the next ratchet tooth. The motor circuit is simultaneously broken by movable contact 97a, whereupon spring 102a causes pawl 98a to advance the ratchet 99a one tooth in a counter-clockwise direction. This motion of armature 96a causes contact 97a to again close the motor circuit through coil 95a and the motor thus continues to vibrate and advance ratchet 99a during the time the tone of oscillator 22 is not being received. Suitable holding pawls 103, 103a cooperate with the ratchets 99, 99a to prevent their reverse rotation. Rotation of ratchet wheel 99a is communicated by shaft 100a to the input of a differential gearing device 104 having the output or driven shaft 105. Shaft 105 controls the rotation of a driven shaft 106 through a torque converter or amplifier 107 which may be operated by suitable power means such as an electric motor M. A driven sprocket wheel 108 is secured to shaft 103 and is in turn connected to the elevator by a sprocket chain 108a. The other input shaft 100 of differential 104 is controlled in a similar manner by relay 83a. The torque converter 107 performs the function of increasing or amplifying the torque supplied by its input shaft 105 and causing its output shaft 106 to rotate in the same direction and through substantially the same angle as its input shaft 105. A suitable torque converter for this purpose is shown and described in the application of William A. Black, Ser. No. 284,644 filed July 15, 1939. This arrangement causes the desired adjustment of the airplane elevators and shaft 106, although the torque applied to shaft 105 by the impulse motors is of small value.

The arrangement described causes shaft 106 and the elevators to remain stationary when the tone frequencies of both oscillators 22 and 23 are being transmitted to the receiver 75 and this shaft to rotate in one direction or the other, depending upon which of the tones is omitted and its rotation will continue for a period of time equal to the duration of the omission. In the example illustrated, motion of lever 2 (Fig. 1) clockwise or forward in the direction of F (Fig. 1) causes the elimination of the tone frequency of generator 23, to which channel Ea is responsive, and the operation of motor 94 and rotation of elevator control shaft 106 to the right or clockwise. When the movement of the lever 2 in the forward direction terminates, the tone frequency of generator 22 continues to be received but the tone frequency of generator 23 is also received and this causes the actuation of relay 83a and the interruption of the circuit of motor 94 at contact 92a, so that both motors are at rest and shaft 106, sprocket wheel 108 and the elevators remain locked in their adjusted position.

Movement of lever 2 further forward to its extreme position in the direction F again causes the elimination of the tone frequency of generator 23 and operation of motor 94 and consequent rotation of shaft 106 to its extreme right position. At this time the tone of generator 22 continues to be received but the extreme movement of sprocket wheel 108 to the right causes the closure of contact 109 by a cam 110. This causes the passage of a current from a battery 86' to energize the winding of relay 83a, thereby breaking the circuit of motor 94 at contact 82a, which stops the motor. In this manner, exact correspondence in phase position of control lever 2 and elevator sprocket wheel 108 is assured in the extreme clockwise position, and the elevators are held in their extreme position.

Upon returning control lever 2 toward its neutral position, shown in Fig. 1, the tone of generator 22 is omitted from the transmission, the channel Ea causing the energization of relay 83a and operation of motor 94a and rotation of sprocket wheel 108 to the left toward its neutral position. This rotation continues until the control lever 2 reaches its neutral position when the tone frequencies of both generators 22 and 23 are omitted from the transmission in a manner above explained. This causes both the relays 83 and 83a to become deenergized, as shown in Fig. 4, so that the circuits of both the motors 94 and 94a are interrupted and both the motors brought to a stop.

If sprocket wheel 108 should not be in phase with control lever 2, as, for example, if it is lagging behind lever 2 when the latter reaches neutral position, both the relays 83 and 83a are deenergized. The circuit including motor coil 95a, battery 101, contact 92, contact 93a and movable contact 111 which cooperates with a cam 112 is closed, causing operation of the motor 94a and continued rotation of sprocket wheel 108 until it reaches neutral position when the motor circuit is broken at contact 111 and operation of the motor 94a ceases. A similar cam 112a and movable contact 111a serve in a similar manner to secure operation of motor 94 and adjustment of sprocket wheel 108 into its neutral position from the opposite direction. Proper in-phase relationship between the elevator control sprocket wheel 108 and the manual control lever 2 in their neutral positions also, is thus assured.

A similar operation takes place in adjusting the sprocket wheel 108 and the elevators from their neutral to their extreme left positions. Movement of lever 2 counter-clockwise or rearwardly in the direction of R (Fig. 1) causes the elimination of the tone frequency of generator 22 to which channel E is responsive with the consequent operation of relay 83a and motor 94a in a manner similar to that above described in connection with channel Ea and motor 94. When sprocket wheel 108 reaches its extreme left position and is in phase with control lever 2, which is now in its extreme rearward position, a cam 113 causes closure of contact 114, which in turn causes the passage of current from battery 86 through the winding of relay 83 and the interruption at contact 92 of the circuit including battery 101 and the coil 95a of motor 94a. The motor 94a being interrupted, no further movement of sprocket wheel 108 to the left takes place but it remains in phase with control lever 2, both being in their extreme counter-clockwise positions, with the elevators in their extreme position. To provide for automatic control of the lateral stability, the three leads L, Fig. 4, are provided for the connection of a gyroscope control (not shown).

Figure 5:
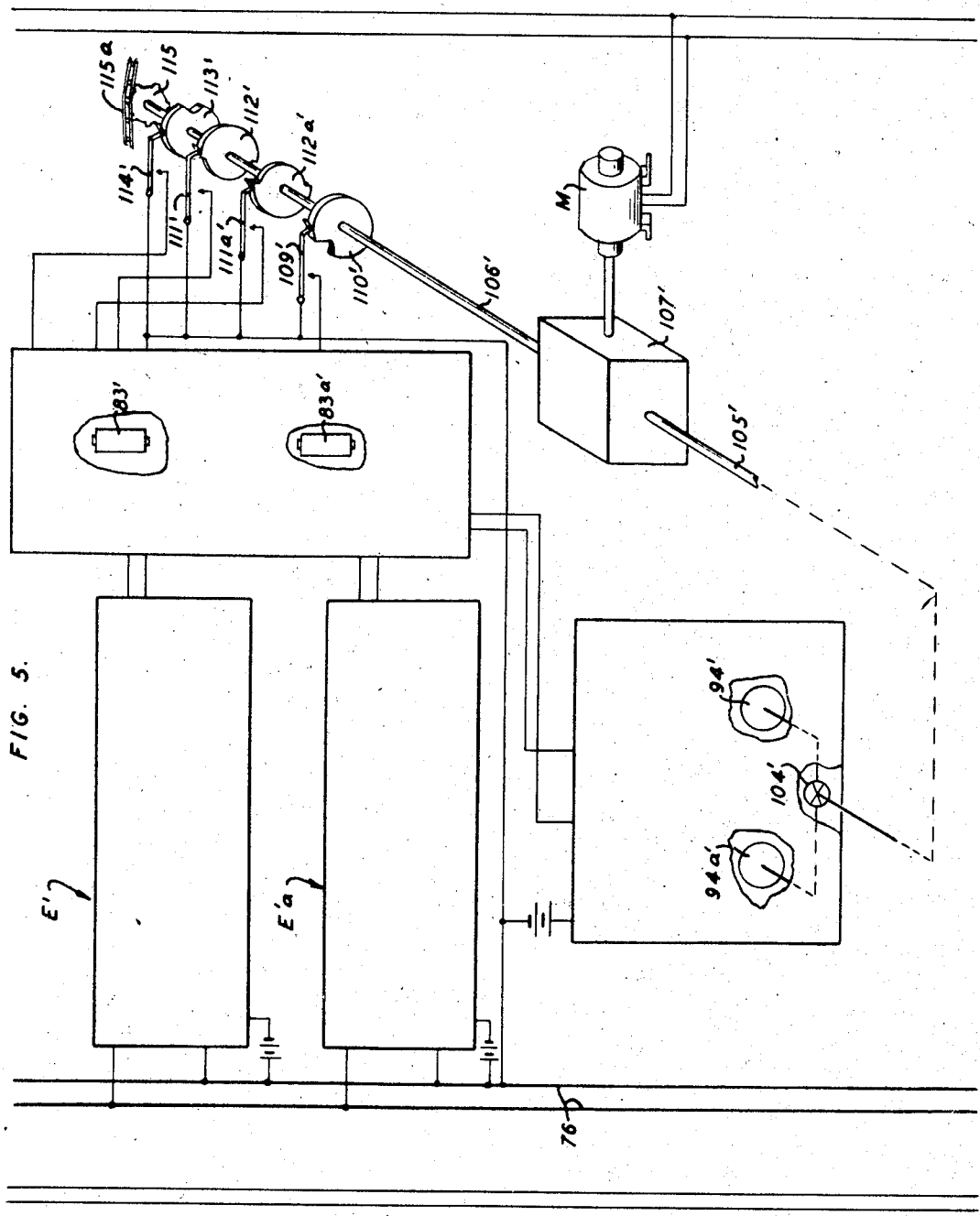
Fig. 5 is a schematic diagram showing an extension of the receiving system of Fig. 4.

Fig. 5 shows diagrammatically the means for controlling one or more ailerons on the airplane and comprises the channels E' and E'a, which are constructed similarly to channels E and Ea above described, except that the resonant circuits of channel E' are designed to pass the tone frequency of generator 22' while those of channel E'a pass the tone frequency of generator 23'. Through the relays 83' and 83a', which are similar to relays 83 and 83a; motors 94' and 94a', which are similar to motors 94 and 94a, a differential 104', torque converter 107' and shaft 106' an aileron sprocket wheel 115 is operated, this sprocket wheel being connected to the ailerons by a sprocket chain 115a. Shaft 106' has mounted thereon the cams 110', 112', 112a' and 113' which cooperate with the movable switch contacts 109', 111', 111a' and 114', respectively, in the same manner as the cams 110, 112, 112a and 113 cooperate with their respective switch contacts, as above described.

With the lever 2 in its neutral position, as shown in Fig. 1, neither of the tone frequencies of generators 22' or 23' is transmitted, the relays 83' and 83a' are unenergized, motors 94' and 94a' are not operated and sprocket wheel 115 remains locked in position. Upon movement of lever 2 to the left in the direction of arrow L, the tone frequency of generator 23' only is transmitted which causes the energization of relay 83a', which in turn causes the operation of motor 94a' and rotation of shaft 105' and 106' to the left, so that the aileron sprocket wheel 115 follows lever 2. Should lever 2 be adjusted into its extreme leftward position, the tone of generator 23' continues to be transmitted, in the manner above described in connection with the operation of generator 23 and lever 2. Rotation of shaft 106' to the left, therefore, continues, if sprocket wheel 115 should not be in phase with lever 2, until these two members are again in phase whereupon cam 113' causes the closure of movable contact 114' and the stoppage of motor 94a' in the manner above explained in connection with motor 94a and movable contact 113. Shaft 106' and sprocket wheel 115 then remain locked in their extreme leftward position until the control lever 2 is again moved to the right.

Upon movement of lever 2 to the right in the direction of arrow r from its extreme left hand position, the tone frequency of generator 22' only is transmitted, which causes the energization of relay 83' which in turn causes the operation of motor 94' and rotation of shaft 106' to the right so that the sprocket wheel 115 follows the motion of lever 2. If lever 2 is adjusted to its neutral position, the tone frequencies of both generators 22' and 23' are omitted from the transmission so that both of the relays 83' and 83a' are unenergized. If at this time the sprocket wheel 115 has not yet reached its neutral position, a circuit is established by the operation of cam 112a' and movable contact 111a', which closes the circuit through the coil of motor 94'. The continued operation of motor 94' rotates the sprocket wheel 115 to its neutral position when the motor circuit is broken at the contact 111a' and operation of motor 94' ceases, locking the sprocket wheel 115 in its neutral position in phase with control lever 2.

If lever 2 is moved to the right beyond its neutral position, the tone of generator 23' continues to be suppressed, the tone frequency of generator 22' only being transmitted. This causes the energization of relay 83' and the operation of motor 94', causing the rotation of shaft 106' and sprocket wheel 115 to the right or clockwise. If control lever 2 is stopped at an intermediate position, the tone frequency of generator 23' is restored to the transmission so that both the relays 83' and 83a' are energized and the circuit of motor 94' broken in a manner above explained in connection with the relays 83, 83a and motor 94. Upon moving lever 2 further toward its extreme clockwise position, the operation of motor 94' is resumed and if at the time lever 2 reaches its extreme clockwise position in the direction indicated by r (Fig. 1), the sprocket wheel 115 has not yet reached its extreme position to the right (Fig. 5), the transmission of the tone frequency of generator 22' continues, causing continued operation of motor 94'. Upon the sprocket wheel 115 reaching its extreme right hand position in phase with control lever 2, the cam 110' causes the closure of contact 109' and the stoppage of motor 94' in the manner above explained in connection with motor 94, cam 110 and contact 109 (Fig. 4). It is thus seen that means is disclosed to provide in-phase relationship between the aileron sprocket wheel and the operators control lever in their neutral positions and also in both their extreme operating positions.

The means provided for operating the rudder of the airplane is shown diagrammatically in Fig. 6, the components corresponding in construction and operation to those above described in connection with Fig. 5, corresponding parts being indicated by the same reference characters double primed, the rudder control sprocket wheel being indicated at 116 and being connected to the rudder by means of the chain 116a. Channel E'' is responsive to the tone frequency of generator 22'' (Fig. 2) and channel Ea'' is responsive to the tone frequency of generator 23''. Depression of the left pedal 54 (Fig. 2) to move the rudder and sprocket wheel 116 to the left, causes the tone frequency of generator 23'' only to be transmitted, which causes the operation of relay 83a'' and motor 94a'' which rotates shaft 106'' and sprocket wheel 116 toward the left. Depression of the right pedal 55 causes the transmission of the tone frequency of generator 22'' only, which causes the energization of relay 83'' and operation of motor 94'' which rotates the sprocket wheel 116 toward the right through the differential 104'' and torque converter 107''. The cams 110'', 112'', 112a'', 113'' and their cooperating contacts shown in Fig. 6 operate to secure in-phase relationship between the rudder sprocket wheel 116 and the control shaft 52 (Fig. 2) at the neutral and both extreme positions of shaft 52 in the same manner as above explained in connection with the corresponding cams and their associated contacts of Fig. 4. The invention thus provides for controlling the rudder of the airplane by means of the conventional two pedals and associated apparatus which is located at the ground station.

Figure 6:
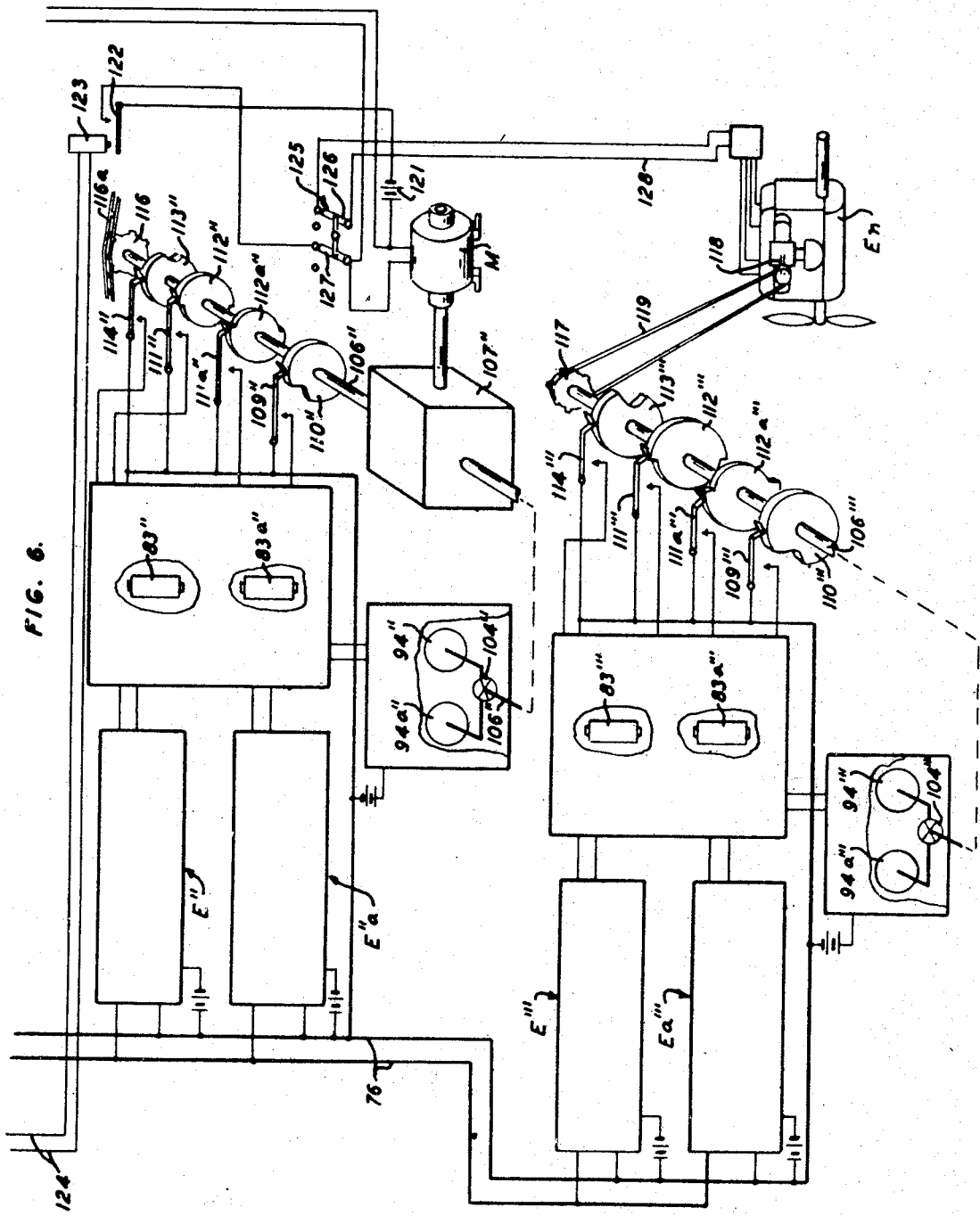
Fig. 6 is a schematic diagram showing a further extension of the receiving system of Fig. 4 and showing schematically an embodiment of the invention for controlling the rudder and throttle of an airplane.

Fig. 6 also shows diagrammatically the means for operating the throttle on the controlled airplane to control its speed. The several components correspond in construction and operation to those above described in connection with Fig. 5, corresponding parts being indicated by the same reference characters triple primed, the throttle control being indicated by a sprocket wheel 117 which may be connected to the throttle valve shaft 118 by any means as, for example, the chain 119. In this case the channels E''' and Ea''' are responsive to the tone frequencies of generators 22''' and 23''' respectively (Fig. 2), the transmission of the tone of generator 22''' only causing rotation of sprocket wheel 117 to the right to open the throttle. The transmission of the tone of generator 23''' only, causes rotation of sprocket wheel 117 to the left with the consequent closing of the throttle. The cams 110''' and 113''' and their cooperating contacts 109''' and 114''' serve to secure in-phase relationship between the sprocket wheel 117 and the throttle adjusting lever 65 (Fig. 2) in fully open and fully closed throttle positions respectively in a manner previously described in connecting with the corresponding parts of Fig. 4, while the cams 112''', 112a''' and their cooperating contacts 111'''' and 111a''' respectively, provide in-phase relationship between the sprocket wheel 117 and control lever 65 at the cruising position of the lever and the cruising position of the throttle in the same manner as previously described in connection with the corresponding parts of Fig. 4.

The torque amplifier motors M are shown in Fig. 4, 5 and 6 as being energized through a circuit including a storage battery 121, dual switch 125 and the movable switch contact 122 of a relay 123, the winding of relay 123 being connected to the receiver 75 by the leads 124. This arrangement provides a ready means for permitting the stopping and starting of the torque amplifier motors by the operator at the ground station. With the switch S2 (Fig. 1) open, the carrier frequency is transmitted, thereby causing the energization of the winding of relay 123, Fig. 6, and the starting of the torque amplifier motors M which will continue to operate until the switch S2 is closed. The closing of this switch suppresses the carrier frequency thereby causing the release of relay 123 and the opening of the motor circuits by the relay switch 122 and thereby stopping the motors.

From the foregoing it will be readily understood that upon the closure of the switch S1, Fig. 1, by the operator and the consequent elimination of the tone frequencies of all the generators 22, 23, 22', etc., from the transmission, each of the controlled shafts 106, 106', 106'' and 106''' (Figs. 4 to 6) will be automatically returned to its mid or neutral position by means of the cams 112, 112a, 112', 112a', etc., in the manner previously described.

In the embodiment illustrated, a manually operable switch 125 is shown as having two switch blades 126 and 127, the switch blade 126 serving to close the main ignition circuit 128 of the airplane engine En and the switch blade 127 serving to close the circuit of the torque amplifier motors M in the closed switch position illustrated in Fig. 6. Assuming that relay 123 is being energized due to the transmission of a carrier current, the pilot of the controlled plane may readily interrupt the main ignition circuit 128 of the engine and simultaneously break the circuit supplying current to the motors M by throwing switch 125 to the left from its position shown in Fig. 6. It is thus seen that the switch 125 provides a ready means under the control of the pilot for stopping the engine of the plane and also for stopping the motors which operate the torque converters.

Figure 7:
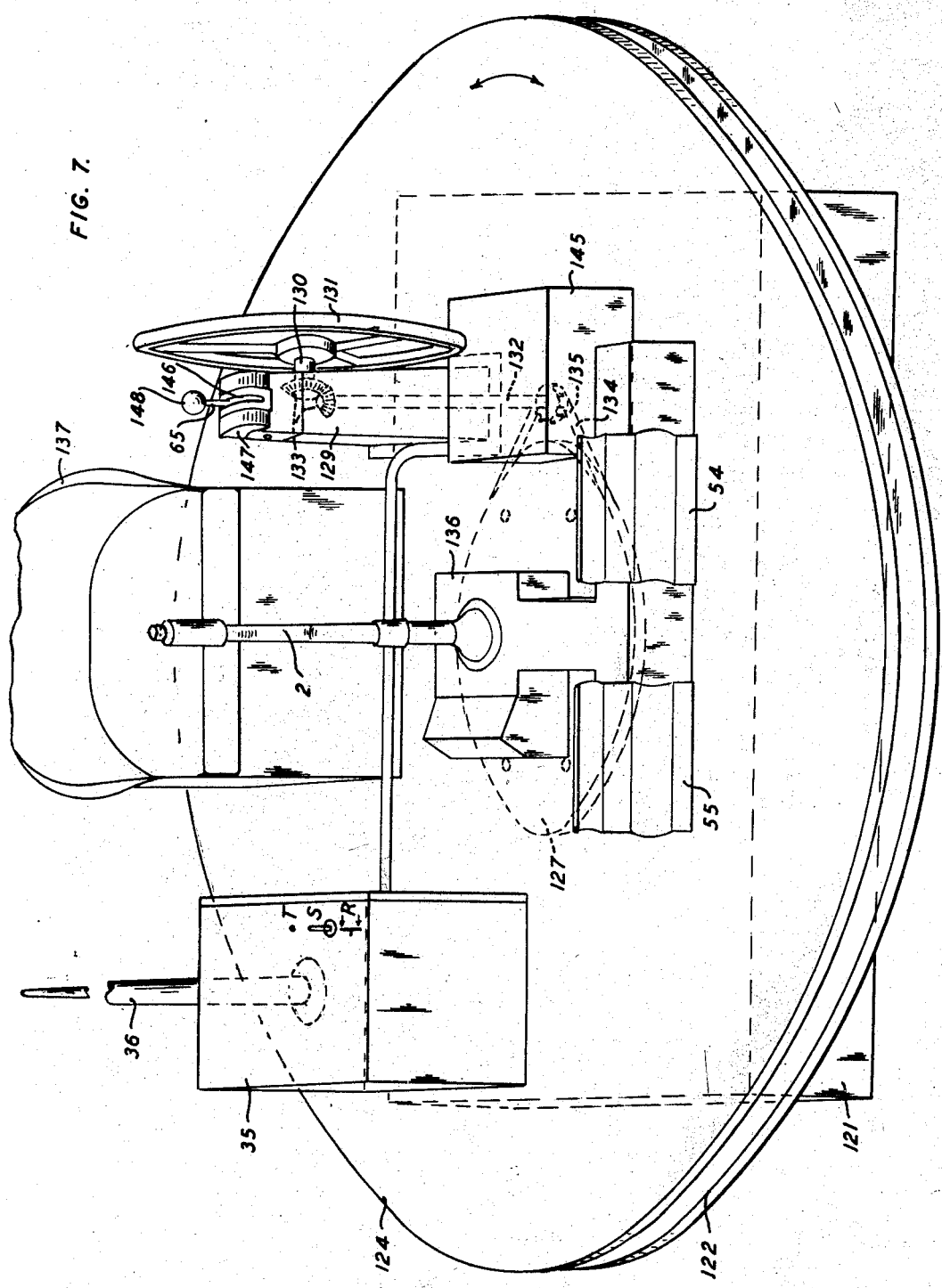
Fig. 7 is a perspective view showing the general arrangement of the control apparatus at the ground station embodying the invention.
Figure 8:
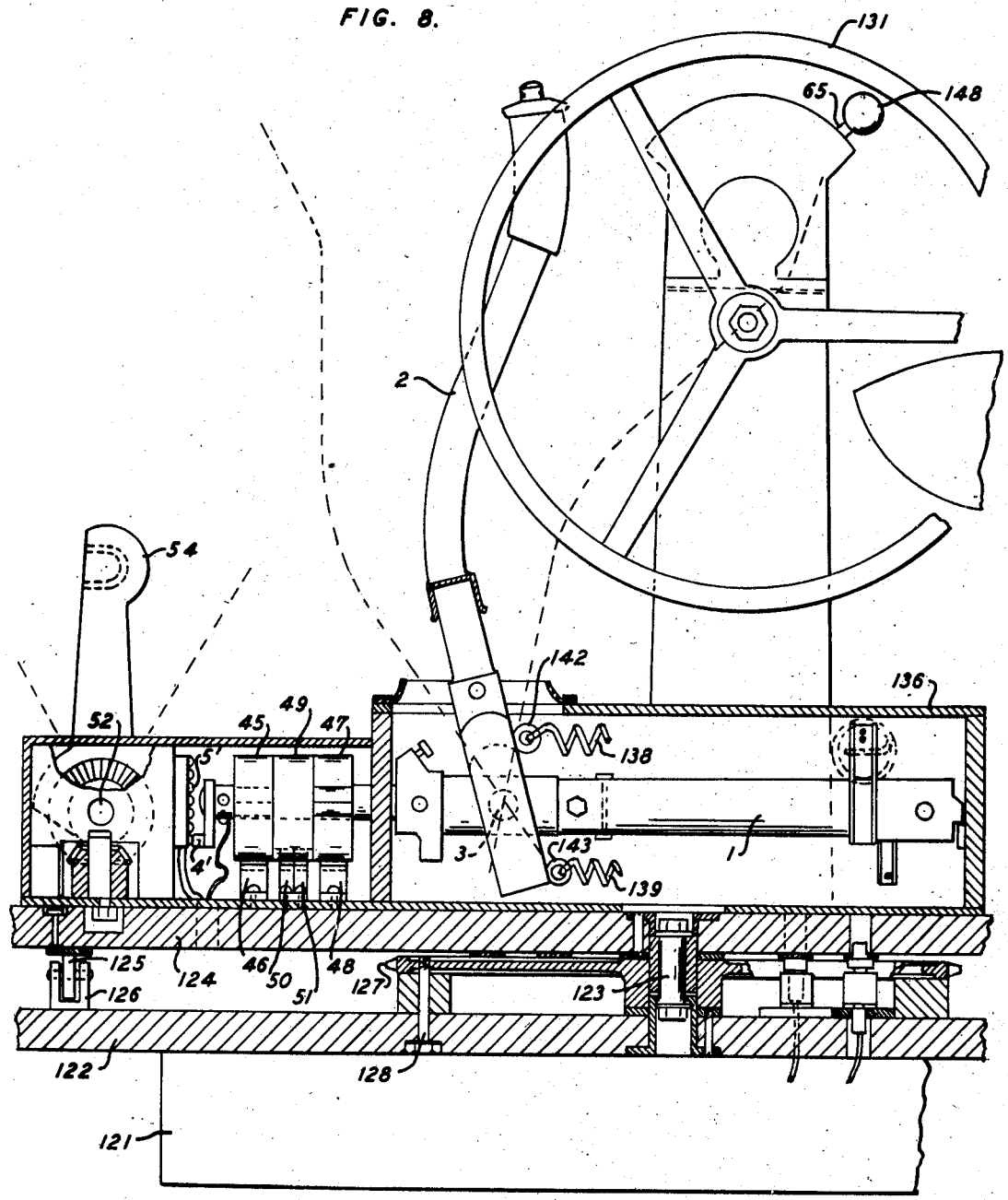

As shown in Fig. 4, a pair of telephone receivers 120 may be connected to the bus bars 76 for use by the safety pilot, should one be on the plane, to listen to any verbal instructions which may be transmitted from the ground station or other control point. For the purpose of conveniently controlling the airplane and permitting it to be kept constantly in view of the operator a suitable ground control station is provided. This station comprises, in general, a rotatable platform upon which is mounted a chair or seat for the operator and about which, within convenient reach of the operator, suitable control handles and pedals are provided arranged in a manner similar to those provided in the usual airplane for effecting the corresponding control operations. Such a ground control station is shown in Figs. 7, 8 and 9 and comprises a supporting foundation 121 which supports a stationary platform 122 carrying a vertical journal bearing 123 on which is rotatably mounted a rotatable platform 124 supported on a plurality of rollers 125 carried by supporting brackets 126, only one of which is shown. Also fixedly mounted on platform 122 is a large sprocket gear 127, a bolt 128 passing through the pinion near its periphery and also through the platform 122 serving to prevent rotation of the gear 127. Also supported on movable platform 124 is a housing 129 in which is mounted a horizontal spindle 130 carrying at its end a large hand control wheel 131. Vertically disposed in the housing 129 is a drive shaft 132 whose upper end is connected to the spindle 130 by a pair of bevel gears 133 and whose lower end is connected to the gear 127 by a chain 134 and sprocket pinion 135. The elevator and aileron control lever or stick 2 is mounted for universal movement near the center of rotatable platform 124 which is provided with a suitable centrally disposed housing 136 in which the elevator and aileron control shafts 1 and 3 are mounted. A suitable chair 137 for the operator is mounted on rotatable platform 124 in the same relative position to control stick 2 that the pilot's seat in the usual airplane occupies with reference to the control stick of the plane.

The control stick 2 is normally held in the neutral position shown in full lines in Figs. 8 and 9 by the tension springs 138, 139, 140 and 141, the movable ends of springs 138 and 139 being inserted in the eyes 142 and 143 secured to stick 2 above and below the axis of shaft 3. The movable ends of springs 140 and 141 are connected to an arm 144 secured to the shaft 1, see Fig. 9. This figure also shows the rheostat arm 4 secured to the end of shaft 3 and the resistor 5 over which it operates, when stick 2 is moved forwards or backwards. The cams 38, 39 and 40 are also shown disposed on shaft 3 and their cooperating contacts 41, 43, 44 and 42, respectively. Fig. 8 shows the rheostat arm 4' secured to the end of shaft 1 and the resistor 5' over which it operates when stick 2 is moved toward or away from the plane of the paper. Cams 45, 47 and 49 are also shown disposed on shaft 1 and their cooperating contacts 46, 48 and 50—51 respectively. It will be noted that the hand wheel 131 is disposed for convenient operation by the operator seated in the chair 137 to rotate the movable platform 124 and permit him to keep the controlled plane constantly in view. Or this wheel may be conveniently operated by an auxiliary operator standing on the platform 124 facing the wheel and who would rotate it so as to keep the operator seated in chair 137 constantly facing the controlled plane.

Fig. 7 also shows the transmitter 35 and transmitting antenna 36 disposed on the rotatable platform 124 on which is also mounted the rudder control pedals 54, 55 in front of the chair 137. A suitable housing 145 for the batteries of the transmitter circuits above referred to is also disposed on platform 124 and the throttle control lever 65 is shown projecting through a slot 146 provided in a casing 147 secured to the upper end of the housing 129. In the embodiment of the invention shown in this figure, a suitable knob or handle 148 is secured to the end of the control arm 65 for operating the same. This figure also shows mounted on the same housing with the transmitter 35, the auxiliary rudder control R, the auxiliary aileron and elevator control stick S and the auxiliary throttle control lever T, these features being above explained in detail in connection with Fig. 3.

Referring to Fig. 10, wherein the mounting features of the foot pedals which operate the rudder control are shown, both the pedals 54, 55 are shown as supported on shaft 52, the hub 149 of pedal 55 being loosely mounted to rotate on shaft 52, the hub 150 of pedal 54 being secured to the shaft by a pin 151. A bevel gear 152 is secured to the hub 149 and a bevel gear 153 to the hub 150, the gears 152, 153 meshing with an idler bevel gear 154, so that depression of the pedal 54 rotates the shaft 52 in one direction and simultaneously raises the pedal 55. Depression of pedal 55 causes rotation of shaft 52 in the opposite direction and the simultaneous raising of pedal 54. The contact arm 4" is secured to the end of shaft 52 and operates over the resistor 5", the cams 58, 60 and 62 being mounted on shaft 52 between contact arm 4' and the pedal 54, the latter cooperating with the movable cams 58, 60, 62 and the contacts 59, 61 and 63—64 in the manner heretofore described.

The throttle control device is shown in more detail in Figs. 11 and 12, the hollow casing 147 comprising the vertical side walls 155 and 156 in which the shaft 66 is journalled, the contact arm 4''' being connected to the end of shaft 66 and engaging the resistor 5''' which is mounted on the casing wall 156. The casing 147 is also provided with an integral vertical wall 157 spaced from but connected to the wall 156 to provide means for enclosing the resistor 5''' and contact arm 4'''. The cams 69 and 72, which cooperate with the switch contacts 70 and 71 in a manner above described are connected to shaft 66 on the opposite sides of lever 65, as shown in Fig. 11. The throttle lever 65 is shown in full lines in Fig. 12 in its mid-position, corresponding to the half open position of the throttle valve on the controlled airplane and in dotted lines to indicate the fully closed position of the throttle.

Figure 13:
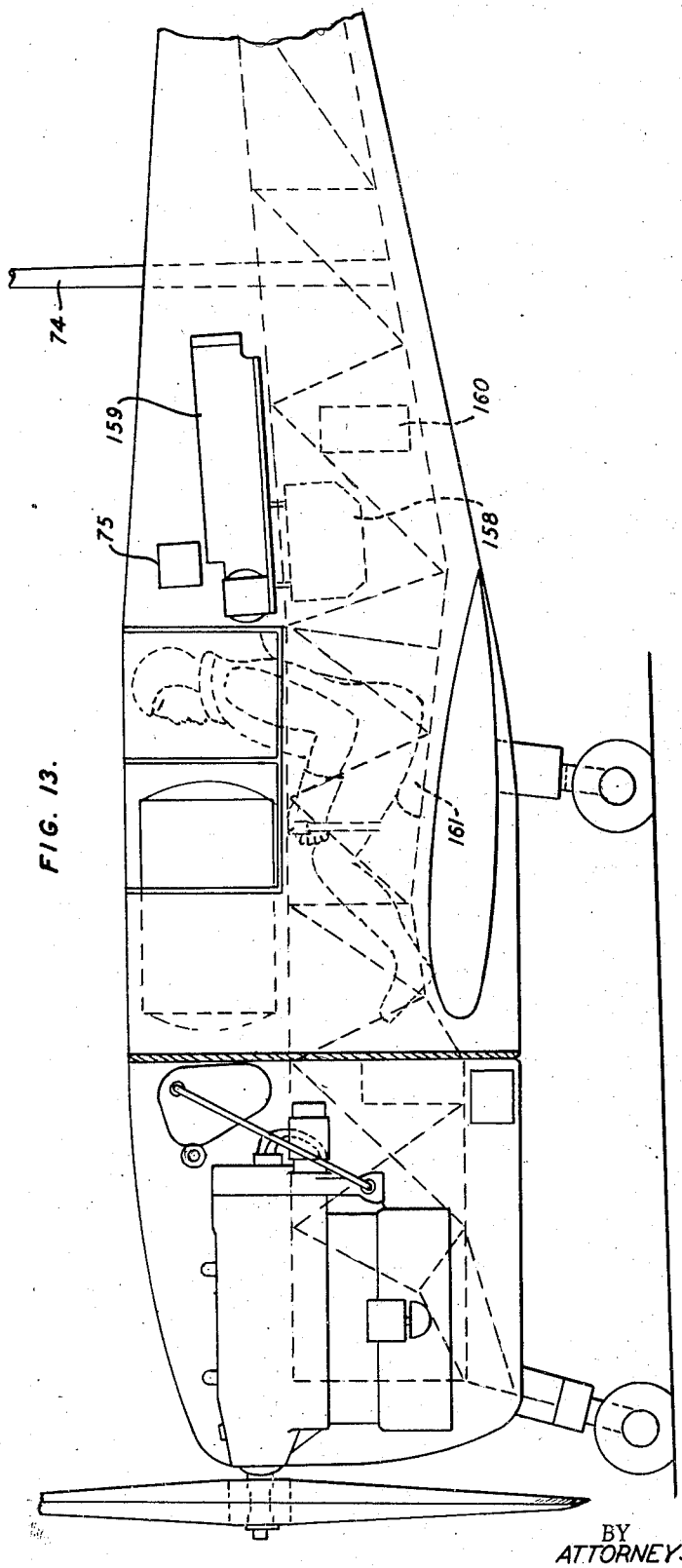
Fig. 13 is a fragmentary front elevation of an airplane showing diagrammatically certain control apparatus embodying the invention mounted thereon.

In Fig. 13 in which the disposition of the operating elements on the controlled airplane is shown, 74 designates the receiving antenna, 158 a housing in which the audio frequency apparatus comprising the channels E, Ea, E', etc., above described is mounted. A housing 159 is provided for the mounting of the mechanical control elements such as the impulse motor, differential gearing, torque converters, etc., above described which operate the movable control members of the plane, 160 designates the storage battery of the plane and 161 a seat for a pilot, should it be desired to operate the plane with one, and 75 the radio receiver.

Referring to Fig. 14 the usual aileron control shafts 162, 163 are shown, these shafts rotating the ailerons 164, 165 in opposite directions by means of the chain 115a which engages a sprocket 115 secured to the end of the aileron control shaft 106'. Chain 115a engages a pair of sprockets 168, 169 which are connected to the links 170, 171 whose lengthening and shortening causes the rotation of the shafts 162 and 163. Each of the links 170, 171 comprises a nut 172 which engages the threaded end of a rod 173, the thread on one rod and its nut being right handed and that on the other left handed. The ends of the links 170, 171 are pivotally connected to arms 174, 174' secured to the shafts 162 and 163 respectively.

The elevator 175 is provided with the usual operating shaft 176 which carries an arm 177 which is pivotally connected to the adjustable link 178 similar to the link 170 above described. A sprocket wheel 179 is connected to the link 178 and engages the chain 108a which is driven by the sprocket 108 secured to the end of shaft 106. The operation of torque converter 107 and shaft 106 in one direction or the other, thus causes the elevation or lowering of the elevator 175.

Control of the rudder 182 by radio is effected through a sprocket 183 secured to the rudder shaft 184, the chain 116a engaging the sprocket 183 and the sprocket 116 which is secured to the end of the shaft 106" which in turn is rotated in one direction or the other by torque amplifier 107". The manner of controlling the rotation of torque amplifier 107" and sprocket wheel 116 by radio from the ground control station is above described in connection with Figs. 2 and 6.

In addition to the means above described for effecting remote control of the plane by radio, means are also preferably provided for permitting its control by means of a pilot seated in the seat 181. Such means, as shown in Fig. 14, comprises a control stick 187 of the usual type which is connected to a flexible cable 188 which in turn is connected to a sprocket 189 which engages the chain 115a. Sidewise motion of the stick 187 causes rotation of the sprocket 189 and movement of the ailerons 164—165. Movement of the stick 187 forwards and backwards is, through a flexible cable 190, caused to rotate a sprocket 191 which engages the chain 108a, movement of the latter serving to operate the elevators in the manner above described. The control of the rudder 182 is effected by a pair of foot pedals 192, 193 which are connected to rotate a sprocket 194 through a flexible cable 195, the sprocket 194 meshing with the chain 116a which in turn is connected to the rudder in the manner above described. Manual control of the throttle is effected from a throttle control lever 196 which is connected with the engine throttle (not shown) by means of a flexible cable 197.

For the purpose of enabling the pilot to readily take manual control of the plane and to simultaneously disconnect the radio operated controls, a main control lever 198 is provided, which when thrown to the left provides for pilot or manual control and when thrown to its extreme right position, for control by radio from the remote control station. The lever 198 serves to rotate a flexible cable 199 to the other end of which is connected a cam arm 200, as shown in Fig. 15, the arm 200 engaging a yoke 201, which through a rod 202 and sleeve 203 serves to oscillate a lever 204 whose other end engages a shiftable clutch member 205 adapted for sliding engagement on a power drive shaft 106". The clutch member 205 is provided with one or more projecting lugs 207 adapted to enter a corresponding number of notches 208 provided in a companion driven clutch member 116 rotatably mounted on the shaft 106". It will also be understood that upon throwing lever 198 to the right, the manual control is released, thus it is apparent that in the position shown in Fig. 15, with the lever 198 thrown to the left, the pilot has control of the rudder through the operating connections therewith, including the flexible cable 195, sprocket 194 and chain 116a. Upon throwing lever 198 to the right, the power driven clutch member 205 will engage driven clutch member 116 and control of the rudder 182 is effected through the radio controlled torque amplifier 107", in the manner heretofore described. While only a single clutch 205—116 has been shown, it will be understood that similar clutches, all operated by the main control lever 198, are provided in connection with the other parts of the plane controlled by radio. The lever 198 also serves to rotate a flexible cable 199' to the other end (not shown) of which is connected a means of engaging and disengaging the throttle control lever of the airplane engine similar to the clutch member 205. In this manner all the automatic controls may be disconnected at one time and the control of the plane taken over by the pilot present.

In the operation of the invention, assume the control operator to be seated in the chair 137 (Fig. 7) facing the airplane at rest on the flying field and with its engine running slowing ready to take off and with the control lever 198 (Fig. 14) thrown to its right hand position for control of the plane by radio. In order to speed up the engine to cause the plane to take off, the operator grasps the handle 148 (Fig. 7) and moves the lever 65 forwards. This causes the frequency of generator 22''' (Fig. 2) only to be transmitted, which causes the operation of motor 94''' (Fig. 6) and rotation of sprocket wheel 117 to the right with the consequent opening of the throttle. As the plane speeds up, the control lever 2 (Fig. 7) is moved rearward about the axis of shaft 3. This causes the tone of generator 22 (Fig. 1) to be omitted from the transmission with the consequent operation of motor 94a and the torque amplifier 107, causing the elevator control shaft 106 to rotate to the left and through the sprocket chain 108a, sprocket wheel 179, link 178, arm 177 and elevator operating shaft 176 (Fig. 14) to operate the elevator 175 in an upward direction to cause the airplane to rise. As heretofore explained, the degree of rotation of shaft 106 and hence the extent of adjustment of the elevator 175 depend on the amount of rearward adjustment of the control lever 2 by the operator, so that he may readily adjust the elevator to secure the desired angle of rise of the plane.

After the plane has risen to the desired height, the operator may move control lever 2 in the opposite direction to level it off. This movement of lever 2 forward about the axis of shaft 3 causes the tone of generator 23 (Fig. 1) to be omitted from the transmission with the consequent operation of motor 94, the rotation of the elevator control shaft 106 to the right with the consequent adjustment of the elevator 175 in a downward direction to level off the plane. During the flight of the plane the operator will, from time to time, rotate the wheel 131 (Fig. 7) a small amount which will cause the rotation of the movable platform 124 and chair 137 so that the operator may continually keep the plane in his field of vision.

To change the course of the plane, as for example by moving its rudder 182 to the left, the operator depresses the left rudder pedal 54 (Fig. 7) to the desired extent. This operation causes the tone frequency of generator 22″ (Fig. 2) to be omitted from the transmission, the operation of motor 94a″ (Fig. 6) which causes the torque converter 107″ to rotate the shaft 106″, sprocket wheel 116 and rudder 182 (Fig. 14) to the left. As heretofore explained, the degree of rotation of shaft 106″ and hence the extent of adjustment of the rudder depends on the extent to which the operator depresses the rudder control pedal 54.

Should the operator wish to bank the airplane on either its left or right side, he moves the lever 2 toward the left or right about the axis of shaft 1. Moving the lever to the left in the direction L (Fig. 1) to bank the airplane on its left side causes the tone frequency of generator 22′ to be omitted from the transmission, causing the operation of motor 94a′ (Fig. 5) and the rotation of shaft 106′ to the left by the torque amplifier 107′. This motion is transmitted to the aileron operating shafts 162, 163, (Fig. 14) through the sprocket wheel 115, sprocket chain 115a, sprocket wheels 168, 169, links 170 and 171 and arms 174, 174′. This causes the aileron 165 to be lowered from its normal wing position while aileron 164 is raised from its normal position and the desired banking of the plane on its left side. While the several operations of the controlled parts of the airplane have been described as operated separately, it will be understood that they may all be controlled simultaneously by the operator moving the control stick 2, lever 65 and the rudder control pedals 54, 55 at the same time.

A preferred form of operating unit in which the impulse motors and differential gearing are shown as applied to the remote control of the throttle of the controlled plane, is shown in Figs. 16 to 19. This unit comprises a housing 210 in which the various parts of the unit are mounted and which is provided with the brackets 211 and 212 adapted for mounting it on the engine. Mounted within the housing 210 is a supporting frame 213 upon which the impulse motors 94‴ and 94a‴ are mounted. These motors are similar and of the telephone type, motor 94a‴ comprising a magnet coil 216, an armature 217 pivoted at 217a, and having pivotally mounted at its lower end a pawl 218 adapted to engage and rotate a ratchet wheel 219 secured to a shaft 220. The armature 217 is adapted to cooperate with a switch 221 which is connected in series with the coil 216. When a current impulse is passed through coil 216 due to the operation of relay 83‴ (Fig. 6), armature 217 is moved to the right, Fig. 18, a distance sufficient to open the switch 221 and to move pawl 218 into engagement with the next tooth of ratchet wheel 219. Upon the breaking of the circuit through coil 216, a spring 222 connected to armature 217 returns the armature to its original position thereby advancing the ratchet wheel 219 a distance of one tooth and simultaneously closing the switch 221. The closure of this switch again causes current to flow through the coil 216 and the operation is repeated as long as the suppression of the tone frequency of generator 23‴ (Fig. 2), and the consequent operation of relay 83‴ (Fig. 6) is continued. The shaft 220 also has secured to it a gear wheel 223. Impulse motor 94‴ is similar to motor 49a‴ and its corresponding parts are designated by corresponding reference characters primed, its gear wheel 223′ being mounted on shaft 220′. Gears 223 and 223′ serve to drive a differential 224 mounted on a shaft 225 which is rotatably supported by a housing 226 formed integral with the main supporting frame 213. Differential 224 comprises a planetary gear support 227 which is riveted to a shoulder 228 formed on the shaft 225. The planet gear support 227 supports two planetary gears 229, 230 which mesh with the gears 231 and 232; the latter gears being integrally formed with the larger gears 233 and 234 respectively. The gears 233 and 234 in turn are in mesh with the gears 223 and 223′ respectively. Thus it will be seen that when one impulse motor is operated while the other remains stationary; as, for example, when the ratchet wheel 219′ is being stepped around clockwise, the gear 223′ will be slowly stepped around in the same direction and the gear 233 will be rotated counterclockwise. Likewise gear 232 will rotate gear 230 clockwise which in turn will drive its related gear 229 counterclockwise. Gear 231 being held stationary, will cause the gear 229 to be carried around it in a counterclockwise direction. Since planet gear 229 is supported on the planet carrier 227, the latter will be carried around in a counterclockwise direction and rotate the shaft 225, to which it is secured, in the same direction. Mounted on the outer end of shaft 225 is a gear 235 which meshes with and drives a larger gear 236 to which is secured a smaller gear 237, the gears 236 and 237 being secured to the shaft 106‴ above referred to in connection with Fig. 6. Gear 237 (Fig. 18) meshes with a much larger gear 238 which is secured to the output shaft 239, this shaft also carrying the sprocket wheel 117 which is connected to the throttle control shaft 118 by means of the sprocket chain 119 (see Fig. 6). The synchronizing cams 110‴, 112‴, 112a‴ and 113‴ above referred to in connection with Fig. 6 are shown in Fig. 17 as mounted on the shaft 106‴.

The mode of operation of the impulse motors 94‴ and 94a‴ by remote control is apparent from the description of Figs. 2 and 6 and 18. Movement of the throttle control lever 65 (Fig. 2) to the right causes the transmission of the tone of generator 22‴ only, to which channel E‴ is responsive, and the operation of relay 83‴ which in turn causes the operation of impulse motor 94‴ and the rotation of sprocket wheel 117 through the ratchet wheel 219′ and the planetary gearing described to the right, to open the throttle. During the operation of motor 94‴, the ratchet wheel 219 and its associated gear 223 remain locked against rotation by the pawl 218 (Fig. 18). In a similar manner, operation of throttle control lever 65 to the left causes the transmission of the tone frequency of generator 23‴ only, to which channel Ea‴ is responsive, and the operation of relay 83a‴ which in turn causes the operation of impulse motor 94a‴ and the rotation of sprocket wheel 117 to the left through the ratchet wheel 219 and the planetary gearing, to close the throttle. During the operation of motor 94a‴, the ratchet wheel 219′ and its associated gear 223′ remain locked against rotation by the pawl 218′. The method of securing synchronization between the sprocket wheel 117 and control lever 65 by means of the cams 110‴ to 113‴ is the same as that above referred to in connection with Fig. 6.

To release the throttle from the remote control operating means described and permit the pilot to take over the manual control of the throttle lever, the control lever 198 above described is connected to a lever 240 secured to a shaft 241 (Fig. 17) mounted for rotation in the frame 213, by means of the flexible cable 199′, Secured to shaft 241 is a two armed lever 242 whose opposite ends are connected to the upper ends of two levers 243, 244 by means of the links 245 and 246, the lower ends of the levers 243, 244 being pivotally mounted on the frame 213, as indicated at 248 and 249. Formed integral with the upper ends of the levers 243, 244 are the extended hubs 250, 251 which are adapted to engage the armatures 217, 217' respectively. Referring to Figs. 16 and 17 it will be seen that rotation of shaft 241 in a clockwise direction by the operation of lever 198 to the left by the pilot, causes the hubs 250, 251 to push the armatures 217, 217' outwardly and thus prevent the operation of the impulse motors 94''' and 94a'''

An auxiliary control means is also provided to prevent control of the impulse motors by the synchronizing cams 110''' to 113''' and their associated control circuits. This auxiliary control means comprises a cam 252 which is secured to shaft 241 and is adapted to engage a lever 253 pivotally connected to the frame 213 by means of a pin 254. Lever 253 is urged inwardly toward the cam 252 by means of a spring 255, one end of which is connected to a pin 256 carried by the lever 253 and the other end of which is connected to a fixed pin 257 mounted in the frame 213. One side of the lever 253 is provided with a pawl tooth 258 which is adapted to engage between the teeth of a ratchet wheel 259 secured to the shaft 106''' (Figs. 16 and 17). With the lever 198 (Fig. 14) thrown to the right for remote control, the cam 252 is in the position shown in Fig. 16 and the impulse motors 94''', 94a''' are free to operate and the cams 110''' to 113''' free to rotate under the control of the ground station. With lever 198 thrown to the left, the cam 252 assumes the position shown in dotted lines in Fig. 16 and the spring 255 causes the pawl tooth 258 to engage the ratchet wheel 259 and hold it and the synchronizing cams in a fixed position, locking them against rotation. The impulse motors are thus prevented from operation by remote control and their control under the action of the synchronizing cams is terminated during the time the pilot takes over the manual control of the throttle lever of the engine carburetor for controlling the engine speed. In the illustrated embodiment of the invention, the control of the vehicle is effected by means of carrier currents transmitted through the atmosphere to a radio receiver mounted on the vehicle. Where the vehicle is movable along the path of a wire or wires, however, its control may be effected in the manner herein described by means of carrier currents transmitted over such wire or wires.

I have described what I believe to be the best embodiments of my invention. I do not wish, however, to be confined to the embodiments shown, but what I desire to cover by Letters Patent is set forth in the appended claims.

1. Means for selectively opening or closing the throttle of an airplane engine comprising in combination, a pair of impulse motors having a common output shaft connected to the throttle and arranged to be rotated in one direction by one impulse motor and in the opposite direction by the other motor, radiant energy means for selectively controlling the operation of the impulse motors from a point remote from the airplane, a first manual control device disposed on the airplane in a position convenient to the pilot thereof and operable into a position to render both the impulse motors ineffective to open or close the throttle, a second manual control device disposed on the airplane in a position convenient to the pilot and connected to open or close the throttle, a movable armature for each impulse motor and means whereby the first manual control device may be moved into an extreme position to engage the armature of both impulse motors.

2. Means for selectively opening or closing the throttle of an airplane engine comprising in combination, a pair of impulse motors having a common output shaft connected to the throttle and arranged to be rotated in one direction by one impulse motor and in the opposite direction by the other motor, radiant energy means for selectively controlling the operation of the impulse motors from a point remote from the airplane, a first manual control device disposed on the airplane in a position convenient to the pilot thereof and operable into a position to render both the impulse motors ineffective to open or close the throttle, a second manual control device disposed on the airplane in a position convenient to the pilot and connected to open or close the throttle, each impulse motor comprising a ratchet wheel and a pawl arranged to intermittently rotate the ratchet wheel, and a differential gearing connected between the ratchet wheels and the common output shaft of the motors, the pawl of each motor being arranged to prevent the reverse rotation of its ratchet wheel while the ratchet wheel of the other motor is rotating the differential gearing.

WILLIAM L. MAXSON.
FREDERICK W. LUTZ.
PETER J. McLAREN.
NICHOLAS V. FEDOTOFF.